United States Patent
Dury et al.

(10) Patent No.: US 10,626,791 B2
(45) Date of Patent: Apr. 21, 2020

(54) VARIABLE COMPRESSION RATIO ENGINE

(71) Applicant: MCE 5 Development, Lyons (FR)

(72) Inventors: Philippe Dury, Miribel (FR); Yves Miehe, Lyons (FR)

(73) Assignee: MCE 5 Development, Lyons (FR)

( * ) Notice: Subject to any disclaimer, the term of this patent is extended or adjusted under 35 U.S.C. 154(b) by 0 days.

(21) Appl. No.: 15/776,736

(22) PCT Filed: Nov. 17, 2016

(86) PCT No.: PCT/FR2016/052985
§ 371 (c)(1),
(2) Date: May 16, 2018

(87) PCT Pub. No.: WO2017/085410
PCT Pub. Date: May 26, 2017

(65) Prior Publication Data
US 2018/0328274 A1    Nov. 15, 2018

(30) Foreign Application Priority Data

Nov. 17, 2015 (FR) ...................... 15 61059

(51) Int. Cl.
*F02B 75/04* (2006.01)
*F16C 3/28* (2006.01)
(Continued)

(52) U.S. Cl.
CPC ............ *F02B 75/045* (2013.01); *F02B 75/04* (2013.01); *F02B 75/048* (2013.01); *F02D 15/02* (2013.01);
(Continued)

(58) Field of Classification Search
CPC ...... F02B 75/04; F02B 75/044; F02B 75/045; F02B 75/047; F02B 75/048; F02D 15/02; F02D 15/00; F16C 3/28; F16C 7/06
See application file for complete search history.

(56) References Cited

U.S. PATENT DOCUMENTS

| | | |
|---|---|---|
| 1,637,245 A | 7/1927 | Scully |
| 2,372,472 A | 3/1945 | Campbell |
(Continued)

FOREIGN PATENT DOCUMENTS

| | | |
|---|---|---|
| CN | 101109321 A | 1/2008 |
| DE | 2753563 A1 | 6/1979 |
(Continued)

OTHER PUBLICATIONS

International Search Report for International Application No. PCT/FR2016/052985 dated Feb. 16, 2017, 3 pages.
(Continued)

*Primary Examiner* — Jacob M Amick
(74) *Attorney, Agent, or Firm* — TraskBritt

(57) ABSTRACT

A variable compression ratio engine comprises a stationary engine block in which movable members interact to enable a piston to translate in a combustion cylinder of the engine block, defining a stroke of the combustion piston. The engine further comprises a self-contained device for adjusting a position of a top dead center of the combustion piston, the self-contained device being connected to or built into at least one of the movable members and having a high-pressure hydraulic chamber to counteract the combustion and inertial forces at a bottom dead center, a low-pressure hydraulic chamber to counteract the inertial forces at the top dead center, at least one calibrated conduit to enable hydrau-
(Continued)

lic fluid to flow between the high- and low-pressure hydraulic chambers, and return means to bring the device back to a nominal position.

17 Claims, 15 Drawing Sheets

(51) Int. Cl.
*F16C 7/06* (2006.01)
*F16C 7/04* (2006.01)
*F02D 15/02* (2006.01)

(52) U.S. Cl.
CPC ............... *F16C 3/28* (2013.01); *F16C 7/04* (2013.01); *F16C 7/06* (2013.01)

(56) References Cited

U.S. PATENT DOCUMENTS

| | | | |
|---|---|---|---|
| 4,111,164 A | 9/1978 | Wuerfel | |
| 4,124,002 A | 11/1978 | Crise | |
| 2002/0050252 A1* | 5/2002 | Moteki | F02B 75/045 123/48 B |
| 2004/0025814 A1 | 2/2004 | Gray | |
| 2011/0226220 A1* | 9/2011 | Wilkins | F02B 75/044 123/48 B |
| 2015/0075497 A1* | 3/2015 | Hutzelmann | F02B 75/044 123/48 A |

FOREIGN PATENT DOCUMENTS

| | | |
|---|---|---|
| DE | 19530191 A1 | 2/1997 |
| DE | 19606622 A1 | 8/1997 |
| DE | 19835146 A1 | 6/1999 |
| DE | 102009013323 | 3/2011 |
| DE | 102010019756 | 11/2011 |
| DE | 102011056298 | 6/2013 |
| DE | 102015001066 B3 | 10/2015 |
| EP | 1407125 | 4/2004 |
| EP | 2063084 A1 | 5/2009 |
| EP | 2620614 | 11/2016 |
| GB | 2161580 A | 1/1986 |
| GB | 2494718 A | 3/2013 |
| GE | P20156290 B | 5/2015 |
| RO | 111863 B1 | 2/1997 |
| SU | 647468 | 2/1979 |
| WO | 0210568 A1 | 2/2002 |
| WO | 2007085739 A2 | 8/2007 |
| WO | 2013092364 | 6/2013 |
| WO | 2014099374 A1 | 6/2014 |

OTHER PUBLICATIONS

International Written Opinion for International Application No. PCT/FR2016/052985 dated Feb. 16, 2017, 5 pages.
European Communication pursuant to Article 94(3) EPC for European Application No. 16812995, dated Jun. 17, 2019, 4 pages.

* cited by examiner

VARIABLE COMPRESSION RATIO ENGINE

CROSS-REFERENCE TO RELATED APPLICATIONS

This application is a national phase entry under 35 U.S.C. § 371 of International Patent Application PCT/FR2016/052985, filed Nov. 17, 2016, designating the United States of America and published as International Patent Publication WO 2017/085410 A1 on May 26, 2017, which claims the benefit under Article 8 of the Patent Cooperation Treaty to French Patent Application Serial No. 1561059, filed Nov. 17, 2015.

TECHNICAL FIELD

The application relates to an engine and the elements of a variable compression ratio engine.

BACKGROUND

As a foreword, it should be recalled that a connecting rod of an internal combustion engine is associated on the side of its foot with the bearing of a combustion piston and on the side of its head with the bearing of a crankshaft. These two bearings generally have parallel axes. As shown, respectively, in FIGS. 1A and 1B, the function of the rod is to transmit the translation movement of the piston from a "top dead center" to a "bottom dead center" as the crankshaft rotates. The rod also helps maintain the angular position of the piston in line with the translation axis of the latter.

Several solutions for adjusting the compression ratio and/or displacement of an internal combustion engine are known in the state of the art.

It should also be recalled that the compression ratio of an internal combustion engine, often referred to as the compression rate, corresponds to the ratio of the volume of the combustion chamber when the piston is at the bottom dead center to the volume of the combustion chamber when the piston is at its top dead center. Everything being equal, the length of the rod determines the compression ratio of the engine.

It is generally agreed that adapting the compression rate of an engine to its load enables a great increase in the engine fuel efficiency. For example, designers sometimes seek to vary the compression ratio between 12 when there is no load and 8 at full load.

For a four-stroke engine, it should be recalled that one complete engine cycle comprises a fresh gas intake cycle followed by a compression cycle, a combustion-expansion cycle, and, lastly, an exhaust cycle. These cycles are of reasonably equal extensions, distributed over 720° of the crankshaft rotation.

The engine load can thus be defined as the constant pressure exerted on the piston crown during the combustion expansion part of an engine cycle (with pressure on the piston crown during the complementary part of the cycle being considered as nil), which corresponds to a torque equal to that developed by the engine over a complete cycle. This pressure reaches a maximum of 10 bars for a current naturally-aspirated engine, and can rise jointly to 20 or 30 bars for a supercharged engine.

Displacement, on its part, corresponds to the volume created by the movement of the piston in the master cylinder from the top dead center to the bottom dead center. Variable displacement is achieved by varying the stroke of the piston in the cylinder. Displacement is not influenced by the length of the connecting rod. The displacement variation must be of a high amplitude for it to have any significant effect on fuel efficiency, and this is technologically challenging to implement.

U.S. Pat. No. 4,111,164 therefore aims to vary engine displacement based on the load applied to it. This document discloses a rod consisting of a spring associated with a hydraulic chamber such that the piston is rigidly coupled to the crankshaft of the engine when the latter is not loaded; and elastically coupling the piston to the crankshaft when the engine is under a heavy load. For this second situation where the load is heavy, the connecting rod acts as a shock absorber, compressing and expanding depending on the pressure at each instance in the engine cycle. U.S. Pat. No. 4,111,164 thus discloses a constant displacement with the load during the intake cycle, while the displacement increases during the combustion cycle, when the load increases. However, the combustion forces partly absorbed in the hydraulic chamber of the rod are not returned, which makes the solution particularly inefficient.

This solution does not therefore enable adjustments in the compression ratio depending on the load applied during one or series of engine cycles. The behavior of this rod is particularly sensitive to the engine speed. The solution proposed in U.S. Pat. No. 4,111,164 further leads to intensely solicit the mechanical components of the connecting rod (spring, hydraulic chamber) during operation of the engine, which accelerates their wear out and reduces the reliability of the system.

Furthermore, the hydraulic chamber of the solution presented in U.S. Pat. No. 4,111,164 is particularly sensitive to temperature changes in the hydraulic fluid, and this, in combination with the sensitivity to the engine speed, makes it very difficult to predict the behavior of the rod.

Document R0111863 describes an internal combustion engine made up of a mobile upper block and a lower block fixed to the vehicle chassis. The upper block is free to pivot on a lateral axis linking the upper block to the lower block. When the engine load increases, the effective average pressure in the cylinder increases and causes a movement of the upper block around the lateral axis. A cylinder volume is thus added to the volume of the combustion chamber, thereby causing a reduction in the compression ratio.

The solution offered in this document requires the design and manufacture of an articulated engine block, which corresponds to none of the standard internal combustion engine designs, which all have a fixed engine block. This requires a complete redesigning of most engine-chassis interface components of the vehicle. Therefore, any components connected to the upper part of the engine (air or fuel intake line, exhaust line, distribution, etc.) must be adapted to tolerate the mobility of the upper part of the engine.

Other documents, such as WO 2013/092364, describe controlled length connecting rods that enable a fixed compression ratio in the internal combustion engine (without affecting the displacement). These solutions require an active rod-length steering system controlled through an external command system (hydraulic piston, electric engine, etc.). The external command systems are generally complex and lead to energy losses, in addition to being unreliable. Furthermore, compression ratio control is not continuous and the accessible value range is often too limited. This is especially the case with the solution proposed in the document cited above, which provides only two different rod lengths.

BRIEF SUMMARY

The present disclosure aims to remedy at least some of the above-mentioned shortcomings in the prior art.

To this effect, this application discloses a variable compression ratio engine comprising a stationary engine block in which movable members, including a combustion piston, a rod, and a crankshaft, interact to enable the piston to translate in a combustion cylinder of the engine block, defining a stroke of the combustion piston ranging from top dead center to bottom dead center, wherein the translation is caused by forces resulting from the combustion of a mixture in the cylinder and inertial forces of the crankshaft.

According to this disclosure, the engine comprises a self-contained device for adjusting the position of the top dead center of the combustion piston, the self-contained device being connected to or built into at least one of the movable members and that has:

- a high-pressure hydraulic chamber to counteract the combustion and inertial forces at the bottom dead center;
- a low-pressure hydraulic chamber to counteract the inertial forces at the top dead center;
- at least one calibrated conduit to enable hydraulic fluid to flow between the high- and low-pressure hydraulic chambers; and
- mechanical return means to bring the device back to a nominal position.

The features of the calibrated conduit and mechanical return means are configured so that the self-contained device forms a highly damped oscillating system.

According to other advantageous and non-exhaustive characteristics of the embodiments disclosed herein, considered individually or in combination, and in accordance with any technically feasible combination:

the characteristics of the mechanical return means and the calibrated conduit are equally configured to enable the length adjustment of the rod in response to average traction and compression efforts to fall in line with a predetermined equation.

the high- and low-pressure hydraulic chambers are defined by the spaces created on either part of the piston as it moves in the cylinder.

the high- and low-pressure hydraulic chambers are defined by the spaces created on either part of a piston rotating in a part of the cylinder.

the high-pressure hydraulic chamber is defined by a first cylinder and a first piston and the low-pressure hydraulic chamber is defined by a second cylinder and a second piston.

the low-pressure hydraulic chamber and/or the high-pressure hydraulic chamber is provided means for injecting hydraulic fluid.

the high-pressure hydraulic chamber and/or the low-pressure hydraulic chamber is provided with a means of discharging excess hydraulic fluid, in order to control the pressure developed in the chamber.

the high-pressure hydraulic chamber and the low-pressure hydraulic chamber have equivalent cross-sections.

the self-contained adjustment device is configured to adjust the length of the connecting rod.

the self-contained adjustment device is configured to adjust the length of an engine compression ratio command member.

the self-contained adjustment device is configured to adjust the position of an engine compression ratio command member.

the self-contained adjustment device is located in a least one of the movable members.

the compression ratio engine has a mechanism for determining the compression ratio.

the self-contained adjustment device comprises:

a. At least one calibrated "traction" conduit allowing only flow from the low-pressure hydraulic chamber to the high-pressure hydraulic chamber;

b. At least one calibrated "compression" conduit allowing only flow from the high-pressure hydraulic chamber to the low-pressure hydraulic chamber.

the compression calibrated conduit allows flow only when pressure in the high-pressure hydraulic chamber exceeds that in the low-pressure hydraulic chamber by a given value to be determined.

the self-contained adjustment mechanism has at least two calibrated compression conduits.

the conduit is configured to enable turbulent flow, and the return means include a spring.

BRIEF DESCRIPTION OF THE DRAWINGS

The disclosure shall be better understood through the description following the non-exhaustive forms of embodiment and examples of the disclosure with reference to the accompanying figures among which are.

DETAILED DESCRIPTION

Figure 2:
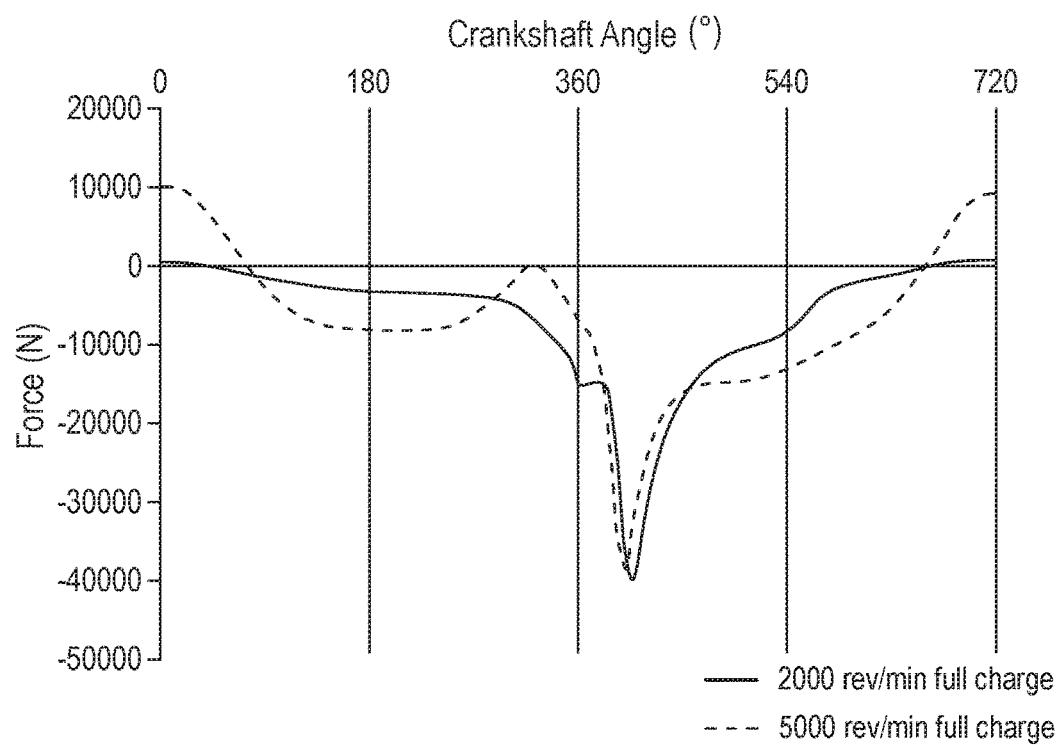
FIG. 2 illustrates forces exerted on the connecting rod during the engine cycle at maximum load and for two different engine speeds.

Connecting rods and other movable members of combustion engines bear traction and compression forces during the operating cycles of the engine. These forces have a double origin: forces originating from the combustion of the mixture inside the combustion cylinder and forces of inertia caused by the crankshaft, due to the speed of the engine. FIG. 2 shows an example of forces exerted on the rod of a conventional combustion engine during the engine cycle for a maximum load at two different engine speeds.

Combustion forces translate exclusively into compression forces on the rod. The maximum amplitude of these efforts is reasonably proportional to the engine load as shown in FIG. 3, as an example.

Figure 4:
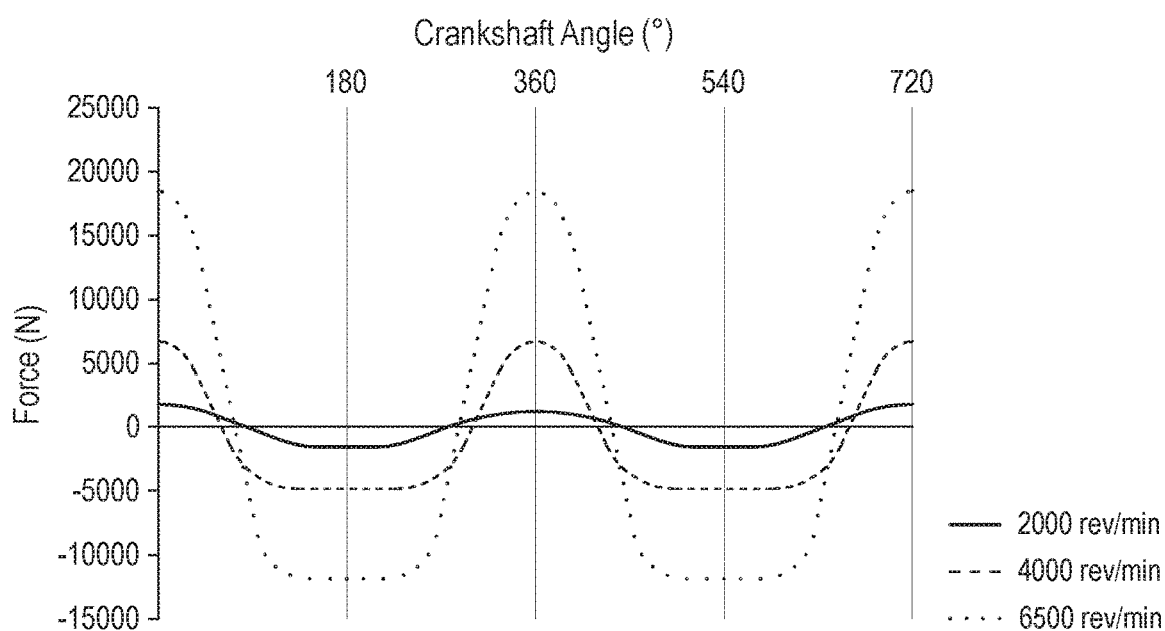
FIG. 4 shows the evolution of inertial forces during an engine cycle, for various speeds of the same engine.

Inertial forces translate on the rod as successive traction and compression forces during the engine cycle. The maximum amplitude of inertial forces is essentially proportional to the square of the engine speed (that is, the rotation speed). This is illustrated in FIG. 4 as an example.

In the course of one engine cycle or several cycles, and if friction is considered negligible, the effort exerted by the inertial force on the rod is nil, and traction and compression forces, although at their maximum amplitudes and at differing speeds, cancel each other out.

Figure 3:
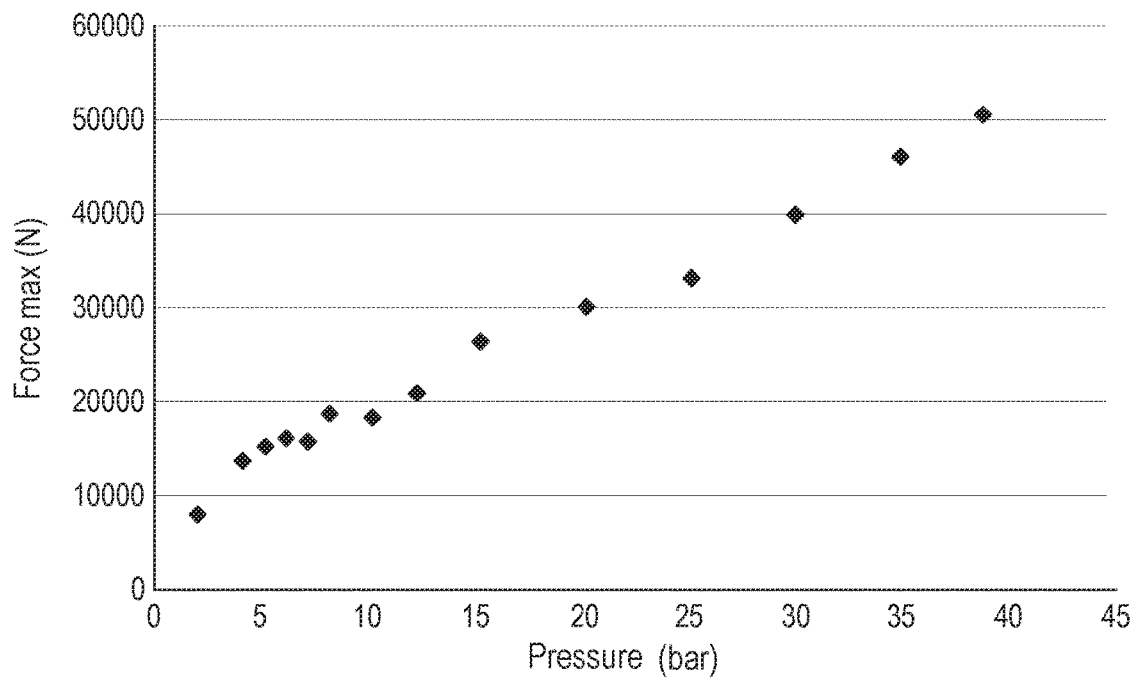
FIG. 3 shows the maximum amplitude of compression forces during the engine cycle depending on load.

Consequently, over one or several engine cycles, the work of the combined forces exerted on the rod corresponds reasonably to the work of the combustion forces, which represent the engine load as stated previously, while describing FIG. 3.

The disclosed embodiment uses these observations as a basis to propose a variable compression ratio engine comprising a self-contained device for the adjustment of the top dead center position of the combustion engine depending on average combustion forces (or, in other words, depending on the engine load). This adjustment of the top dead center of the combustion piston enables autonomous (that is without necessitating the implementation of an active steering system) adjustment of the compression ratio of the engine to its load.

By "average forces" we mean forces exerted during the engine cycle or set of cycles.

Figure 5A:
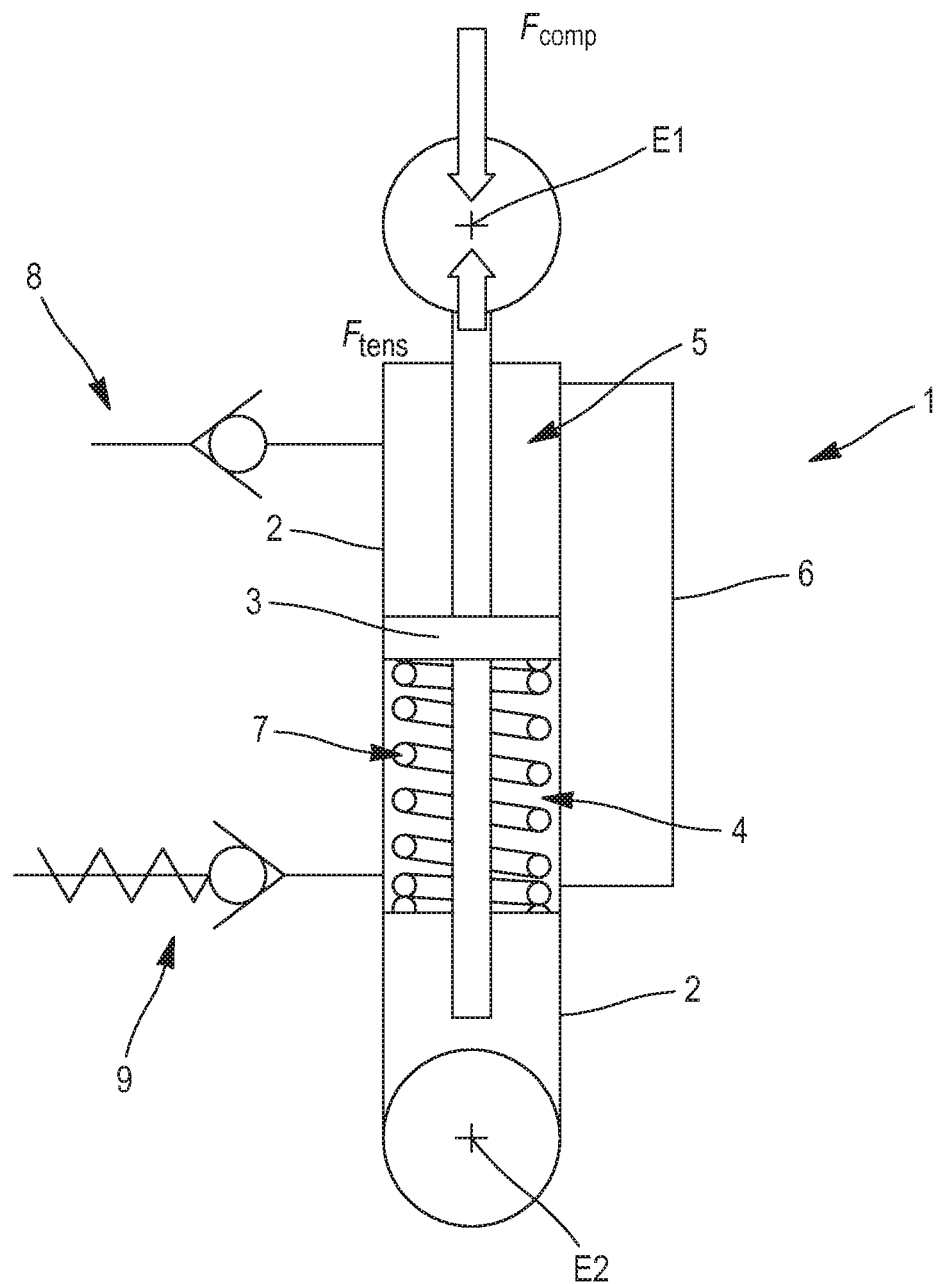
FIGS. 5A and 5B show two theoretical configurations of a self-contained adjustment device in accordance with the disclosed embodiment.

A self-contained adjustment device in line with the disclosure as diagrammatically represented in FIG. 5A, comprises a cylinder 2 and a (translation or rotation-wise) movable piston 3 in the cylinder 2. Within the context of this application, "cylinder" and "piston" shall refer to the entire set of parts enabling the definition of at least one chamber between them, with the volume of the chamber adjusting as the piston moves. Thus, it may be a cylindrical recess in which a circular section piston slides; but the disclosure is in no way limited to this configuration. As will be presented hereinafter in a particular embodiment of the disclosure, the cylinder may be made up of a simple bore in disc portion and the piston formed out of a radial mobile part rotating inside the bore, following the axis of the disk generating the bore.

Whatever the configuration chosen for the cylinder 2 and piston 3, both can be integrated and linked to any of the movable members and/or engine block, as will be described during the presentation of the various forms of embodiment of the disclosure, the reason being to enable control of the piston's top dead center position.

The engine corresponding to the disclosure comprises a stationary engine block (that is, the position of the combustion cylinders and the cylinder head is fixed in relation to the crankshaft) and is configured so as to transmit compression and/or traction exerted on the combustion piston to piston 3 of the self-contained adjustment device 1. And this device, in reaction, is designed to adjust the top dead center position of the combustion piston so as to modify or adapt the engine compression ratio. In other words, the displacement of piston 3 in cylinder 2 will help adjust the top dead center of the combustion piston between the first stop (minimal position of piston 3 in cylinder 2) and the second stop (nominal position of piston 3 in cylinder 2), depending on the average magnitude of the combustion forces.

The self-contained adjustment device 1 is configured to increase the volume of the combustion chamber with an increase in the magnitude of the combustion force.

Piston 3 defines an initial hydraulic chamber 4 in cylinder 2 described as a "high-pressure" chamber. This chamber is able to transmit compression forces, Fcomp, exerted on the device 1 along the longitudinal axis defined by piston 3 and a second hydraulic chamber described as a "low-pressure" chamber that is able to transmit traction, Ftens, exerted on the device 1 following its longitudinal axis. These two "high-pressure" and "low-pressure" chambers 4 and 5 are in fluid communication by means of at least one calibrated conduit 6.

The movement of piston 3 is triggered by the application of traction and compression transmitted into the device 1 and enabled (within the limits allowed by the stops) by the flow of fluid from one chamber to another through the calibrated conduit 6. In the absence of any flow, the device 1 behaves as a rigid body, since the movement of piston 3 in cylinder 2 is limited to the compressibility of the hydraulic fluid put under pressure from the traction/compression forces.

Figure 5B:
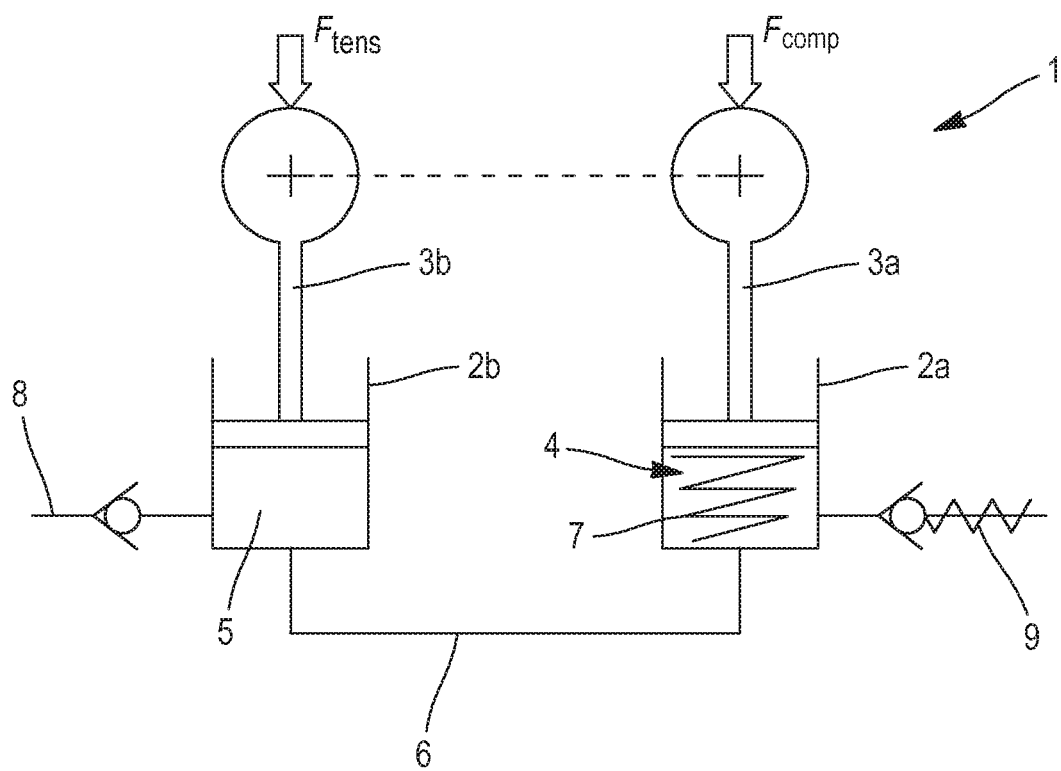

FIG. 5B presents an alternative configuration of the self-contained adjustment device 1. In this configuration, the high-pressure hydraulic chamber 4 is defined by means of a first cylinder 2a and a first piston 3a, on which the compression is exerted. The low-pressure hydraulic chamber 5 is defined by means of a second cylinder 2b and a second piston 3b on which traction forces are exerted. Pistons 3a and 3b are mechanically and kinematically linked, as shown by the dotted line in FIG. 5B.

Just like in the main configuration in FIG. 5A, the two high- and low-pressure chambers 4, 5 are in fluid communication through the calibrated conduit 6.

Whatever configuration is chosen, the dynamics of the flow between the two chambers 4, 5 determines the adjustment speed of the device 1 to instant forces exerted. The movement of piston 3 (or pistons 3a and 3b) enable adjustment of the top dead center of the combustion piston of the variable compression ratio engine.

According to the disclosure, this configuration is chosen (especially through the gauging of the calibrated conduit(s)) to prevent reaction or allow only controlled and limited reaction to instant inertial or combustion forces.

In a particularly advantageous manner, the calibrated conduit(s) 6 are configured to foster turbulent flow. In fact, in turbulent flow conditions, as opposed to laminar flow conditions, the equation linking the flow rate to the pressure is much less sensitive to the fluid temperature. Contributions are made such as to establish a sensibly constant device 1 despite the variations in the hydraulic fluid temperature (which can range from −20° C. when cold to extreme temperatures of 150° C. inside the engine when it is running).

As is well known, turbulent flow is fostered by diminishing the length/diameter ratio of the conduit and by penalizing the entry of the hydraulic liquid into the conduit so as to create a violent transition between the chamber and the conduit in question (for example, entry cones of the convergent type may not be formed between chambers 4, 5 and the conduit 6).

According to a first configuration, the cylinder 2 of the rod and/or piston 3 (or cylinders 2a, 2b and pistons 3a, 3b) are provided with sealing to prevent any flows of hydraulic fluid from one chamber 4, 5 to another except through the provided calibrated conduit(s) 6 (or preventing the flow of hydraulic fluid outside chambers 4, 5 in the alternative configuration of the device 1).

Figure 6:
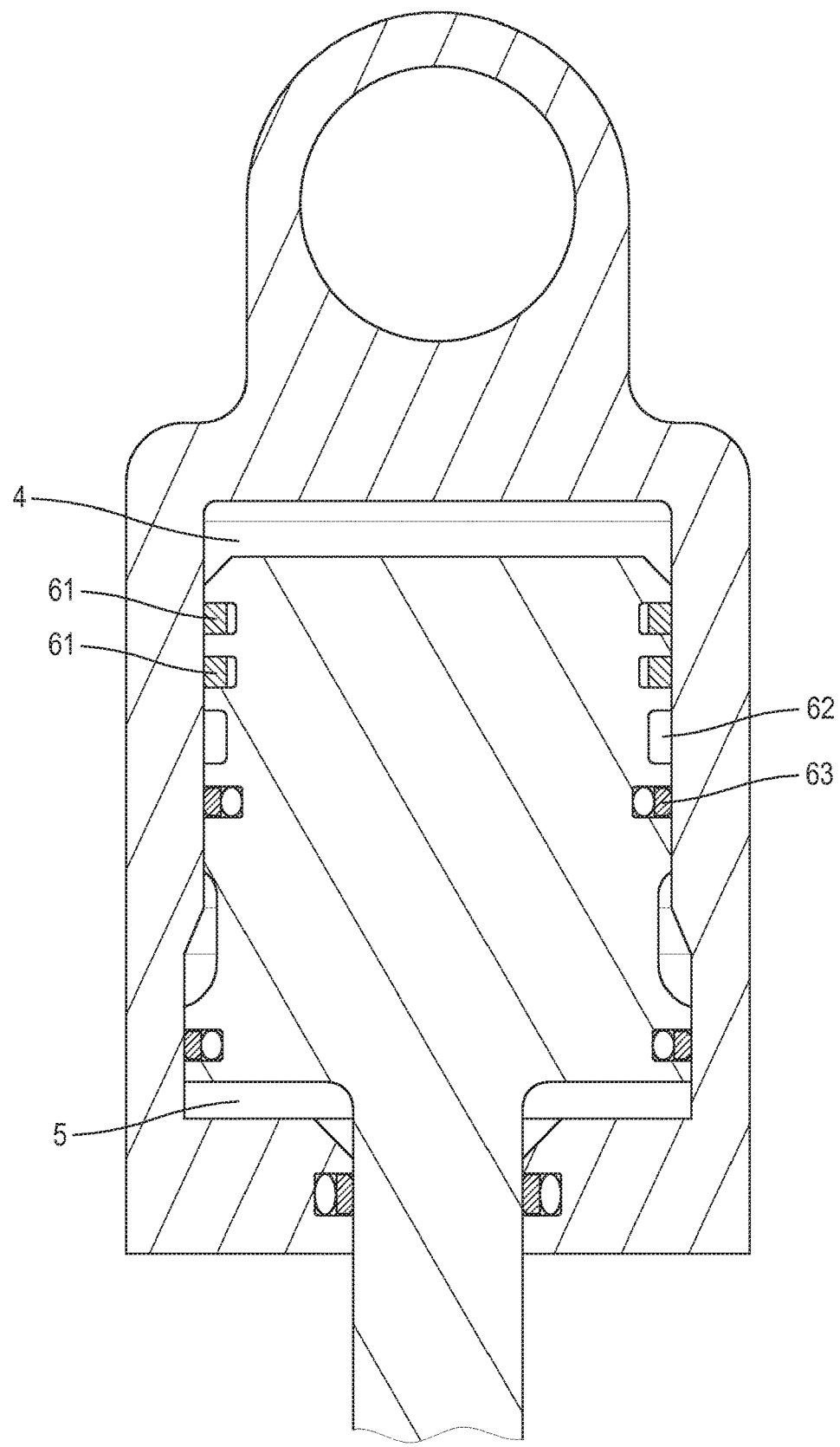
FIG. 6 shows sealing means in line with one form of an embodiment of the disclosure.

In a particular embodiment of the main configuration of device 1, as shown in FIG. 6, the sealing means include those at the level of the slide face of the piston, and in succession from the high-pressure chamber 4 toward the low-pressure chamber 5:

one or several metallic segments 61 that help in containing the pressure front of the fluid in the high-pressure chamber 4;

an intermediate hydraulic fluid reservoir 62;

and a joint 63 (for example, composite or O-ring) ensuring the sealing of the entire assembly.

Similar sealing can also be provided on pistons 3a, 3b of the alternative configuration of device 1, as shown in FIG. 5B.

The calibrated conduit 6 between low-pressure chamber 5 and high-pressure chamber 4 is preferably formed in piston 3 and/or the cylinder 2. Advantageously, and for simplicity in manufacturing, the calibrated conduit 6 or one of the calibrated conduits 6 between the low-pressure chamber 5 and the high-pressure chamber 4 is formed in the piston 3. Alternatively, this conduit or any of the calibrated conduits 6 can be formed in the body of the cylinder 2.

According to a second embodiment of the main configuration of the device 1, the cylinder 2 and piston 3 are not provided with any sealing. In this case, the interplay between the piston 3 and the cylinder 2 is chosen such as to enable the flow of the liquid between the two chambers, and in itself constitutes a calibrated conduit 6 between the low-pressure chamber 5 and the high-pressure chamber 4. In this configuration, at least one additional calibrated conduit 6 in the piston 3 and/or the cylinder body 2 may be provided.

Furthermore, and still with respect to the description in FIGS. 5A and 5B, the device 1, in line with the disclosure, comprises mechanical return means 7 configured to bring the piston 3 (or at least one of the pistons 3a, 3b) to its nominal position in the absence of any external traction or compression.

The self-contained adjustment device 1 is thus an oscillating system.

The calibrated conduit(s) 6 and mechanical return means 7 are configured and/or chosen to adjust the position of the piston 3 (or pistons 3a, 3b) to the average forces of traction and compression exerted on the device 1 in the course of one or several engine cycles. In other words, the characteristics of the mechanical return means (stiffness, pre-loading, etc.) and of the calibrated conduit(s) (number, diameter, length, nature of flow, etc.) are chosen so that the rod forms or behaves like a highly damped oscillating system. It should be recalled that a highly damped oscillating system is an oscillating system with a damping factor of more than 1.

The functioning of the device in line with the disclosure, when operational in an engine, is presented below.

When the engine starts, the piston 3 (or pistons 3a, 3b) is or are in nominal position, the mechanical return means 7 helps place the piston 3/cylinder 2 in the first mechanical stop. The engine at start up thus has its compression ratio defined by the nominal position of the piston 3 (or pistons 3a, 3b).

Dynamic traction and compression forces exerted on the device 1 when under-loaded, which correspond essentially to the inertial forces, develop at a faster pace than the flow in calibrated conduit 6 between the high-pressure hydraulic chamber 4 and the low-pressure calibrated chamber 5. Also, the piston 3 position in the cylinder 2 (or the position of pistons 3a and 3b in cylinders 2a and 2b) is not essentially affected by these forces, although low amplitude oscillations can appear.

When the engine load increases, the mean compression forces become sufficient to enable a significant transfer of the hydraulic fluid from the high-pressure chamber 4 to the low-pressure chamber 5. This flow leads to a displacement of the piston 3 in the cylinder 2 (or pistons 3a, 3b in cylinders 2a, 2b) and in the displacement from the top dead center of the combustion piston. The engine compression ratio is adjusted in a fully autonomous manner, according to this position.

Advantageously, the mechanical return means 7 comprise a spring, for example, a compression spring, arranged to exert a force tending to reposition the piston 3 (or pistons 3a, 3b) in the nominal position. The spring can be placed in the hydraulic high-pressure chamber 4, or arranged on the device 1 outside this chamber 4.

The spring can be stiff leading to the exertion of an increasing return force with the contraction of the device 1. In general, when the return forces are only exerted by the spring and outside the effects of the stops or transitory effects, when average combustion forces corresponding to the engine load are balanced with the force exerted by the return means 7, the length or position of the device 1 is essentially stabilized around the equilibrium length or position, although low amplitude oscillations can be felt.

Conversely, when the engine load reduces, the hydraulic load tends to be transferred through the calibrated conduit 6 and the low-pressure chamber 5 toward the high-pressure chamber 4, and the piston 3 (or pistons 3a, 3b) tend(s) to return to its or their first mechanical stop, which corresponds to a nominal position. The compression ratio of the engine is thus adjusted accordingly.

The stiffness of the spring is chosen to agree with the maximum movement of the piston 3 (or pistons 3a, 3b), between the two stops, for a chosen set of loads.

The spring could be recharged, that is, when the device 1 is in its nominal position, at rest, the spring exerts a return force at a threshold above zero. Therefore, as long as the average combustion force (compression force) remains lower than the threshold return force, the position of the piston 3 remains fixed, at its nominal position. As shall be described below, part of the threshold return force can be contributed by the hydraulic part of the device 1. In such a case, the part of the threshold force exerted by the spring could be reduced, and the dimension of the spring as well.

According to a particular embodiment of this disclosure, the spring is preloaded to a threshold return force above zero and its chosen stiffness set at around zero such that, for example, the variation in force from one stop to another does not exceed 70% of the pre-load force. As such, an essentially constant return force is exerted on piston 3 (or pistons 3a, 3b) irrespectively of its or their position. Thus is a device 1 constituted with the ability to accommodate two stable configurations, at its stops:

In the first configuration, the device 1 is arranged in an initial nominal position for as long as the average combustion force exerted remains lower than the threshold return force;

In the second configuration, the device 1 is arranged in a second nominal position when the average combustion force is higher than the threshold return force.

This implementation method is particularly appropriate for the implementation of the device 1, being simple and low cost, for the embodiment of an autonomous "two-rate" variable compression ratio engine. The engine has a first compression ratio imposed by the nominal position of the device in its first configuration, when under-loaded; and a second compression ratio imposed by the minimal position in the second configuration, for a load higher than the threshold load.

The cylinder 2 and piston 3 (or cylinders 2a, 2b and pistons 3a, 3b) can have a circular section, or non-circular section, such as an oval section, which prevents the risk of rotation on the longitudinal axis of these two bodies.

In general, the dimensions of cylinder 2 and piston 3 (or cylinders 2a, 2b and pistons 3a, 3b) are chosen to minimize crowding of the device 1 and to enable its placement in a traditionally designed internal combustion engine. However, the minimum dimension of the device 1 is limited by the maximum hydraulic fluid pressure that can develop in the hydraulic chambers 4, 5. In this regard, an oval cylinder 2 section and piston 3 are sometimes appropriate as they enable accommodation of crowding and pressure constraints. Whatever the case, surfaces subjected to hydraulic fluid pressure at the low-pressure chamber 5 and the high-pressure chamber 4 are chosen to be sufficient such that when the piston 3 (or pistons 3a, 3b) is or are subjected to a maximum force, the pressure inside either chamber should not be excessive compared to the resistance of the sealing, for example.

The cylinder 2 and/or piston 3 can be provided with hydraulic fluid filling means 8 at the level of the high-pressure chamber 4 or low-pressure chamber 5. These hydraulic fluid filling means 8 helps maintain the chambers 4 or 5 filled with this fluid, thus compensating any likely leakages. It can be a conduit with one of its ends leading to the cylinder 2 (or at least one of the cylinders 2a, 2b), while the second end leads to a hydraulic fluid source.

Preferably, the first end of the conduit leads to the low-pressure chamber 5 because this enables advantage to be taken of the pumping effect occurring when a compression force is exerted on piston 3 and as such fosters the refilling of the hydraulic fluid into the cylinder 2. The conduit could be provided with a non-return valve preventing flow outside the cylinder through the conduit, as shown diagrammatically in FIGS. 5A and 5B.

To limit the pressure in the cylinder 2, it can be provided with a means of discharge 9. These discharge means can consist of or comprise a simple conduit leading away from the high-pressure chamber 4 forming a constant leakage, or a conduit with a pressure controller, for example, in the form of a differential valve with a threshold pressure equal to the maximum pressure desired in this chamber.

It is particularly advantageous that the low-pressure chamber 5 and the high-pressure chamber 4 have equivalent sections. By "equivalent sections" we mean that the volume swept by the piston 3 movement (or that of pistons 3a, 3b) in one of the chambers 4, 5 is identical to the volume swept in the other chamber by the movement of the piston 3 (or that of pistons 3a and 3b).

The "equivalent section" condition is met when the high- and low-pressure chambers 4, 5 are defined by the translation of at least one piston 3 into at least one cylinder 2, when surfaces subject to pressure from each face of the piston 3 (or pistons 3a, 3b), when projected on a perpendicular plane to the direction of movement of the piston, are essentially equal.

For a given engine operating point, and when the piston 3 (or pistons 3a, 3b) has reached its equilibrium position, the difference in pressure between the two chambers 4, 5 remains constant no matter the temperature of the hydraulic fluid.

In general, given that the condition of equivalent section is respected, the balance of forces generated on the command member by pressure from either side of the piston 3 (or pistons 3a, 3b) is constant, no matter the temperature of the hydraulic fluid.

The internal pressure of the chambers 4, 5 is particularly variable with the expansion of the hydraulic fluid as a function of temperature (which can range from −20° when cold in extreme weather to 150° C. when the engine is running). Where section equivalence is not achieved, the variability in internal pressure could lead to variability in the forces exerted on the piston 3 (or pistons 3a, 3b). Consequently, the device 1 will have a variable behavior (position of the piston 3 depending on the engine load) with change in temperature, which is generally undesirable.

In other words, in the absence of the non-return differential valve 6, device 1 tends to balance pressure in the high- and low-pressure chambers 4, 5 as it operates. When the sections are not equivalent, the average force generated by the pressure on the piston 3 (or pistons 3a and 3b) is no longer zero. It is proportional to the difference in section between the chambers 4, 5, and proportional to the average ambient pressure in the chambers 4, 5. However, given that the hydraulic fluid is strongly subjected to thermal expansion, it follows that the pressure in the chambers 4, 5 may vary during the rise in temperature in the engine. For this reason, the balance between the forces exerted by the return means 7, the combustion force, and the hydraulic forces exerted on the piston 3 (or pistons 3a, 3b) is perturbed by temperature, a situation that is undesirable. Equivalent section conditions have the advantage of contributing to maintain a reasonably constant behavior (compression ratio/load function) in the device 1, and this, in spite of temperature variations.

Figure 7C:
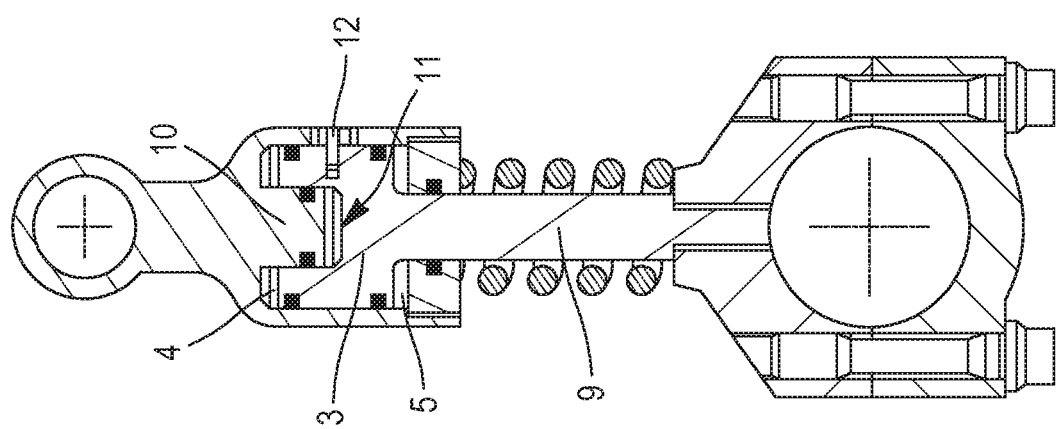
FIGS. 7A to 7C show three configurations that all respect the condition of equivalent cross sections.
Figure 7B:
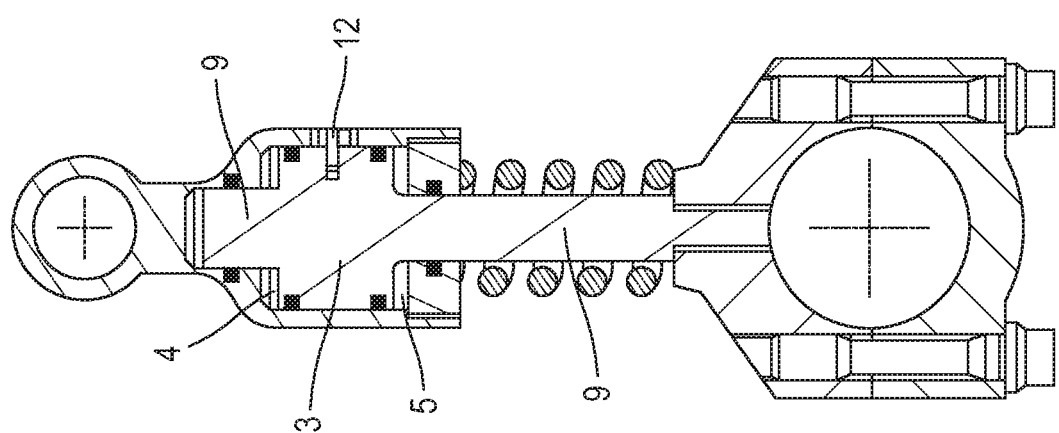
Figure 7A:
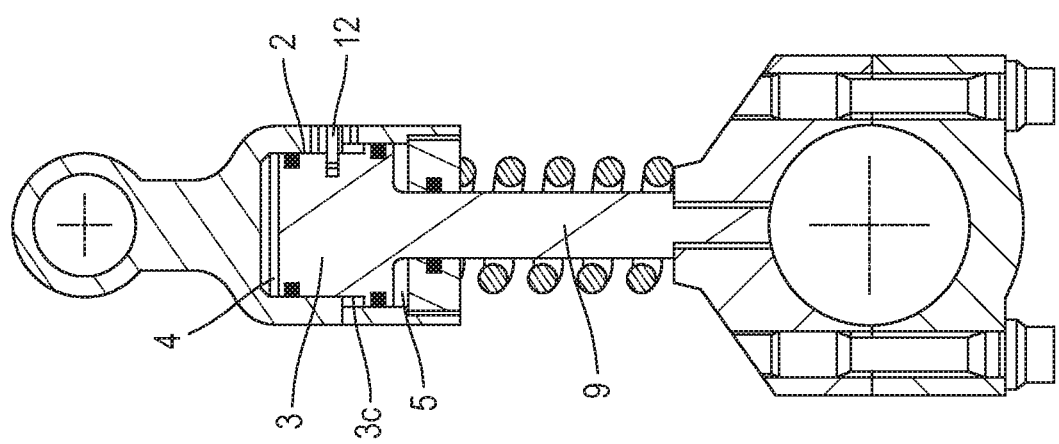

Several configurations of the hydraulic chamber 4, 5 help meet the condition of equivalent sections, and protection against the effect of temperature changes, as shown in FIGS. 7A-7C for illustration purposes.

According to a first example, shown in FIG. 7A, this condition is met in a two-stage piston 3. In this figure, the cylinder 2 has a circular shoulder 3c such that the low-pressure chamber 5 has a larger diameter than that of the high-pressure chamber 4. This difference in diameter is compensated by the section of the piston 3 stem 9 in the low-pressure chamber 5, such that the final volume created by the movement of the piston 3 in the chamber is identical to the volume created in the other chamber by the same movement of the piston 3.

According to another example, shown in FIG. 7B, this condition is met by a piston 3 with a salient external rod. The piston 3 stem 9 extends on both sides of the piston 3 and into the volume of each of the chambers 4, 5. By so doing, the condition of equivalent section is also respected.

According to third example, shown in FIG. 7C, this condition is obtained by a piston with a salient internal rod. In this figure, the high-pressure chamber 4 has a protruding member with a section identical to that of the piston 3 stem 9. This protruding member 10 is adjusted to a bore 11 created in the piston 3, such that the piston 3 can slide in. By so doing, the condition of equivalent section is also respected.

To have greater flexibility in adjusting the flow dynamics, the device 1 can comprise:

At least one calibrated "traction" conduit 6a (FIG. 11) allowing only flow from the low-pressure hydraulic chamber 5 to the high-pressure hydraulic chamber 4;

At least one calibrated "compression" conduit 6b (FIG. 11) allowing only flow from the high-pressure hydraulic chamber 4 to the low-pressure hydraulic chamber 5.

Each of the conduits 6a, 6b can be provided with a valve to enable one directional flow.

Each of the conduits 6a, 6b can also be adjusted (for example, in their calibration) independently of the other such that adjustment differentiated dynamics are enabled in the device 1 depending on the traction or compression force exerted.

In a preferred variant, the compression calibrated conduit 6b allows flow only when pressure in the high-pressure hydraulic chamber 4 exceeds that in the low-pressure hydraulic chamber 5 by a given value to be determined. This can easily be achieved by providing the conduit 6b with a differentiated non-return valve with a predetermined pressure difference.

By thus blocking any flow below the predetermined pressure difference, all compressive movements of the piston 3 in the cylinder 2 of the connecting rod are prevented for as long as this pressure is not exceeded. As such, a similar effect to that of the pre-loading of the return means 7 is obtained, as such, these means could be smaller for the same effect.

In a variant, the device 1 can have two compression calibrated conduits 6b, with one being simple and enabling calibrated flow as soon as a compression force is exerted, and the other being provided with a differentiated non-return valve to enable complementary flow as soon as sufficient compressive force is applied (by inducing a sufficient pressure difference between the two chambers).

This thus affords additional means to adjust the flow dynamics and therefore the speed of adjustment to instant forces exerted and, more broadly, to control the equation linking the compression ratio to the engine load.

Valves generally comprise a mobile part (such as a ball) that can move in a given direction and cooperate with a valve seat and/or spring. This well known mechanism enables selective opening or closing of a flow passage depending on the difference in pressure existing upstream or downstream of the passage.

Advantageously, valves are associated to conduits 6, 6a, 6b and/or the refill 8 and/or discharge means 9 in the device 1 and are arranged such that the directions of mobility of their movable parts are parallel to the big and small end axes of the connecting rod. In this configuration, the movable parts are not subjected to any accelerations by the device 1 in their directions of mobility (if the latter is built into a movable engine member, the connecting rod for example) as it operates in the engine. In this way, the opening and closing behavior of the valves is made independent from the engine speed during operation.

According to another advantageous aspect, the valves have a mechanical stop that controls the movable part, thus limiting the opening and enabling control of the flow rate, and thus preventing excessive use of the valve spring where such is present.

In some cases, the conduits 6, 6a, 6b could also be provided with "leaking" valves, for which a bypass conduit is placed parallel to the valve itself. As is well known per se, the "leaking" valves enable dissociation of rising flows from descending flows, and adjustment of flows.

The determination of the configuration and calibration of conduits 6a, 6b between the high-pressure chamber 4 and the low-pressure chamber 5, of course, depends on the configuration of the engine in which the device 1 will have to function, and the rated or expected performance of the engine.

Figure 8:
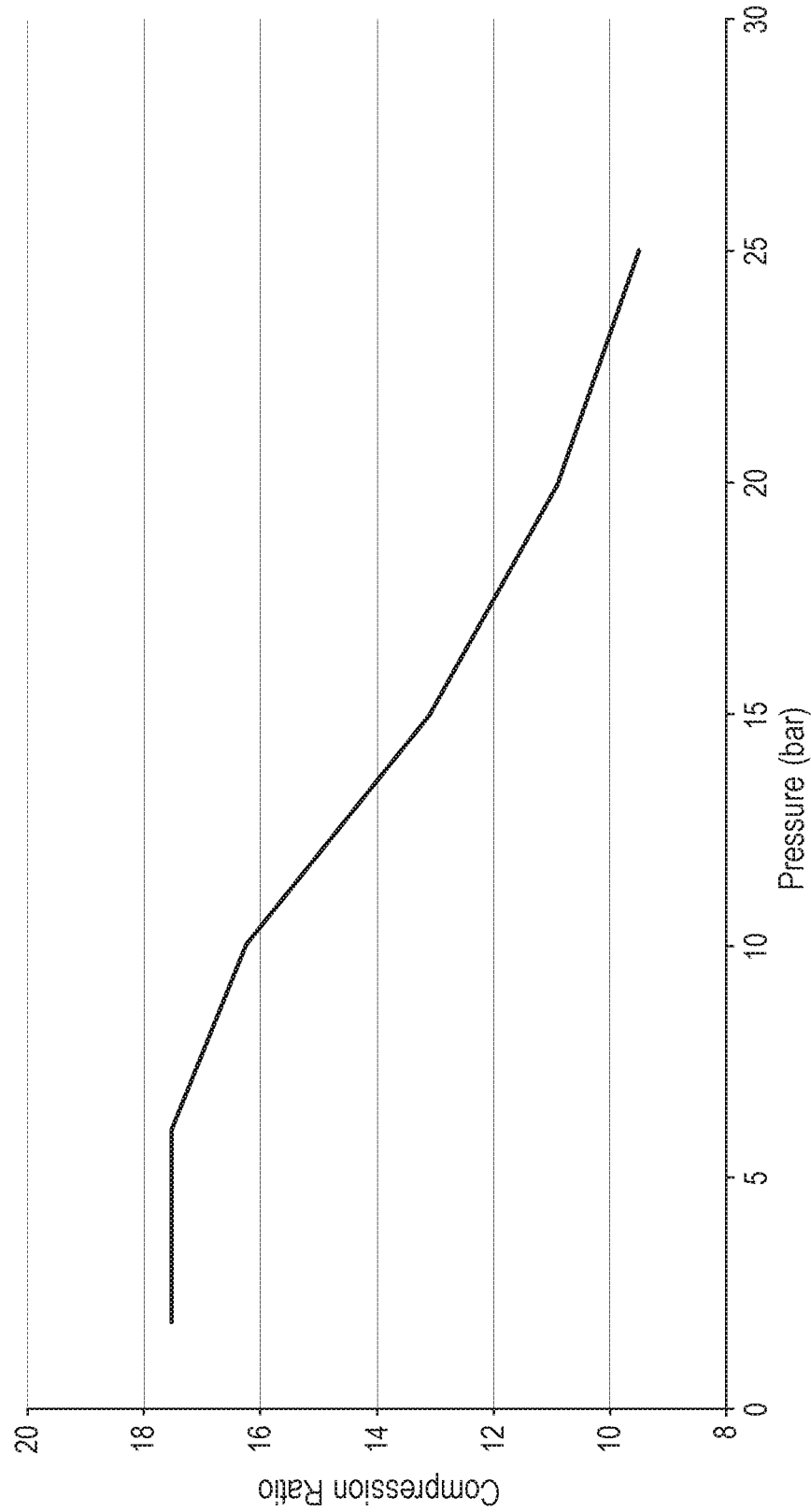
FIG. 8 represents a law on engine load behavior vs. targeted compression ratio of the engine.

The general aim is to ensure that the functioning of the device 1 (adjustment of the top dead center of the combustion piston when the engine is loaded, that is, to average traction and compression forces) complies with a predetermined equation made based on the sought characteristics of the engine, for example, to give it a speed like that of the curve in FIG. 8. This could imply arbitration between the complexity of the configuration chosen for the flow (number of conduits, etc.) and its performance. Generally, the characteristics of the mechanical return means 7 and the calibrated conduit(s) are chosen to enable adjustment of the top dead center of the combustion piston to average traction and compression forces in compliance with a predetermined equation.

Those skilled in the art can use common methods to embody this phase of design and/or validation. In particular, digital simulation and optimization means or test benches could be used where such enable solicitation of the device 1 by traction and compression according to the chosen profiles in other to characterize behavior.

Figure 8A:
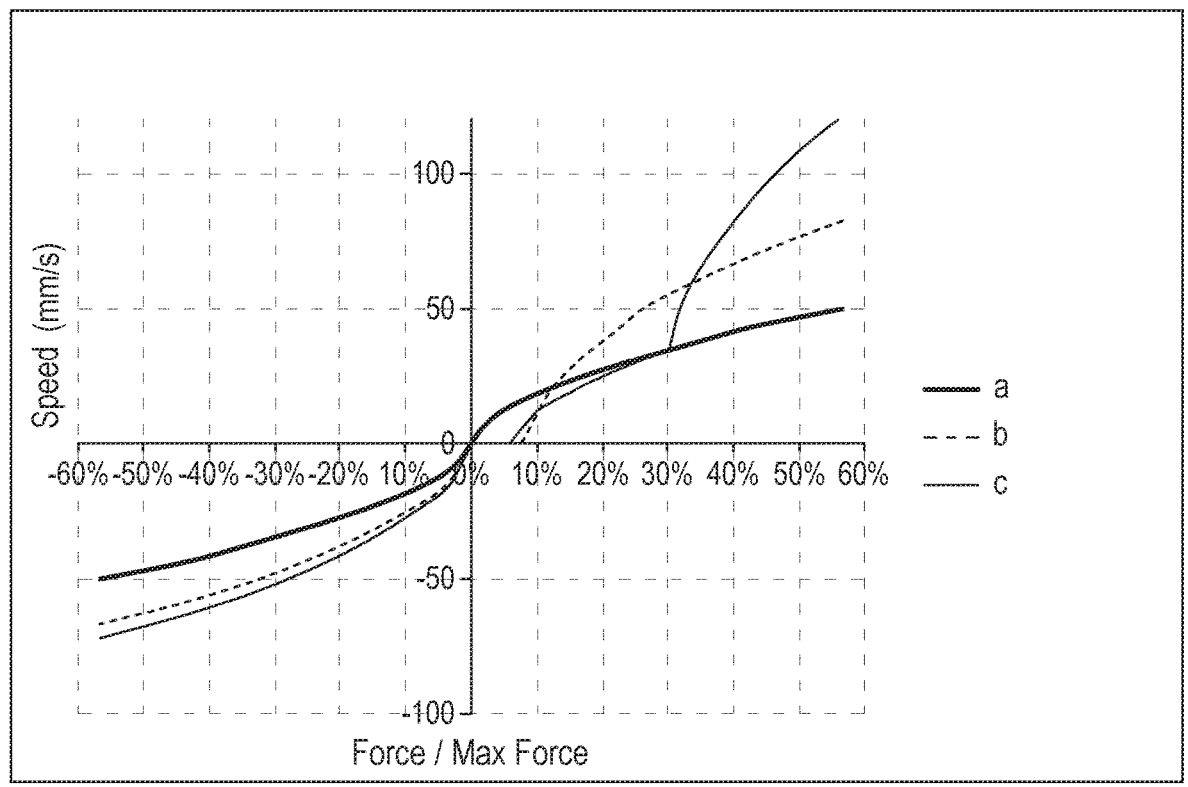
FIG. 8A shows damping laws corresponding to the maximum speed of elongation of the connecting rod depending on the amplitude of the constant effort applied on it for three configurations of the disclosed embodiment applied to three different connecting rods.

For example, when the self-contained device 1 corresponding to the disclosure is built into a variable length connecting rod to adjust the top dead center of the combustion piston in the combustion cylinder in line with the average combustion forces, those skilled in the art will seek to reproduce damping corresponding to the equation in FIG. 8A. This figure shows (in the y-axis) the elongation speed of the connecting rod, as a function (in the x-axis) of the amplitude of the constant force exerted on it. This amplitude is normalized by the maximum force applied on the rod, corresponding to the peak combustion. In FIG. 8A, three functions are presented for illustration purposes, for three different configurations of the rod and in line with the disclosure:

(a) a rod with a single calibrated conduit;
(b) a rod with two calibrated conduits, respectively for traction and compression, with the compression conduit provided with a differentiated non-return valve; and
(c) a rod with three calibrated conduits, one for traction and two for compression, with each of the compression conduits provided with a differentiated non-return valve.

These damping functions are, among other things, characterized by a displacement speed ranging between 30 and 200 mm/s when the force exerted reaches 50% of the maximum visible effort on the rod.

A speed of 30 mm/s helps ensure the system has a minimum of lengthwise oscillations in the rod round its equilibrium position during an engine cycle, but has the effect of slowing the variation in the compression ratio when the engine load varies. A speed of 200 mm/s on the contrary, helps ensure rapid variation in the damping function when the load varies, but can cause lengthwise oscillations in the rod around its equilibrium position. The presence of just one or several differentiated non-return valve(s) helps establish a behavior function with the best compromise between the lengthwise oscillations of the connecting rod and responsiveness to changes in compression ratio.

The variable compression ratio engine can equally optionally comprise means for determining the effective compression ratio during operation. This could, for example, be (a magnetic structure) positioned on the combustion rod and enable detection of its passage in front of a detector placed in the engine or integrated into the crankcase (for example, a Hall effect sensor). The solution in Document DE102009013323 can also apply. By so doing, a system to determine the position of the top dead center or bottom dead center of the combustion piston is created.

Generally, the variable compression ratio engine will have the advantage of being provided with a device to determine the compression ratio, since this information can be useful in controlling the engine components. To this effect, the engine or device in which this disclosure will function can have the advantage of being equipped with the necessary sensors, a calculated and associated program enabling the determination of compression ratio, and its consideration in controlling other engine components. It could also, for example, be the known solution of the above-mentioned document or the target and the detector constituting the system used for determining the position of the top dead center or the bottom dead center of the combustion piston.

DETAILED DESCRIPTION

Example 1: Self-Contained Device Built into the Rod of a Conventional Engine

Figure 1A:
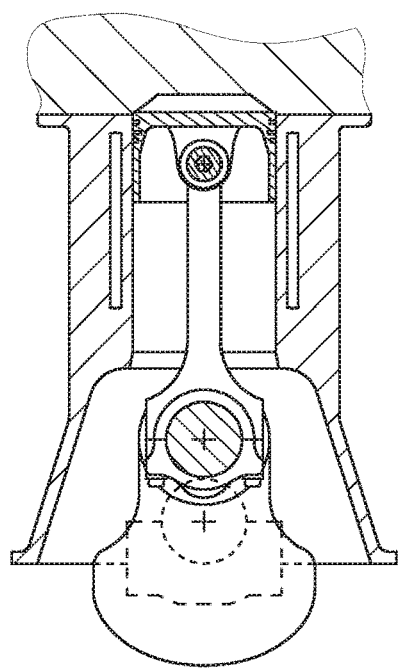
FIGS. 1A and 1B show the top dead center and bottom dead center of a conventional internal combustion engine piston.
Figure 1B:
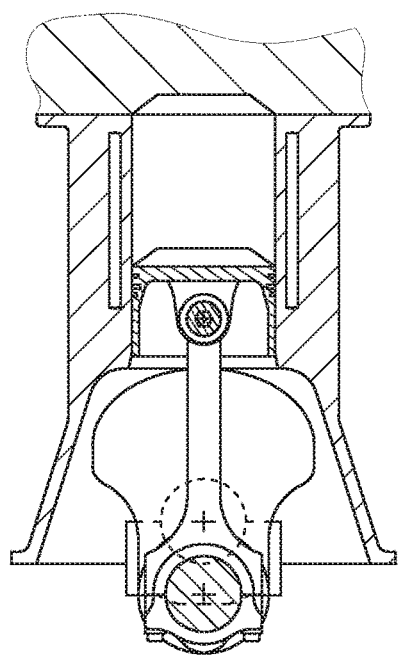
Figures 9, 9A:
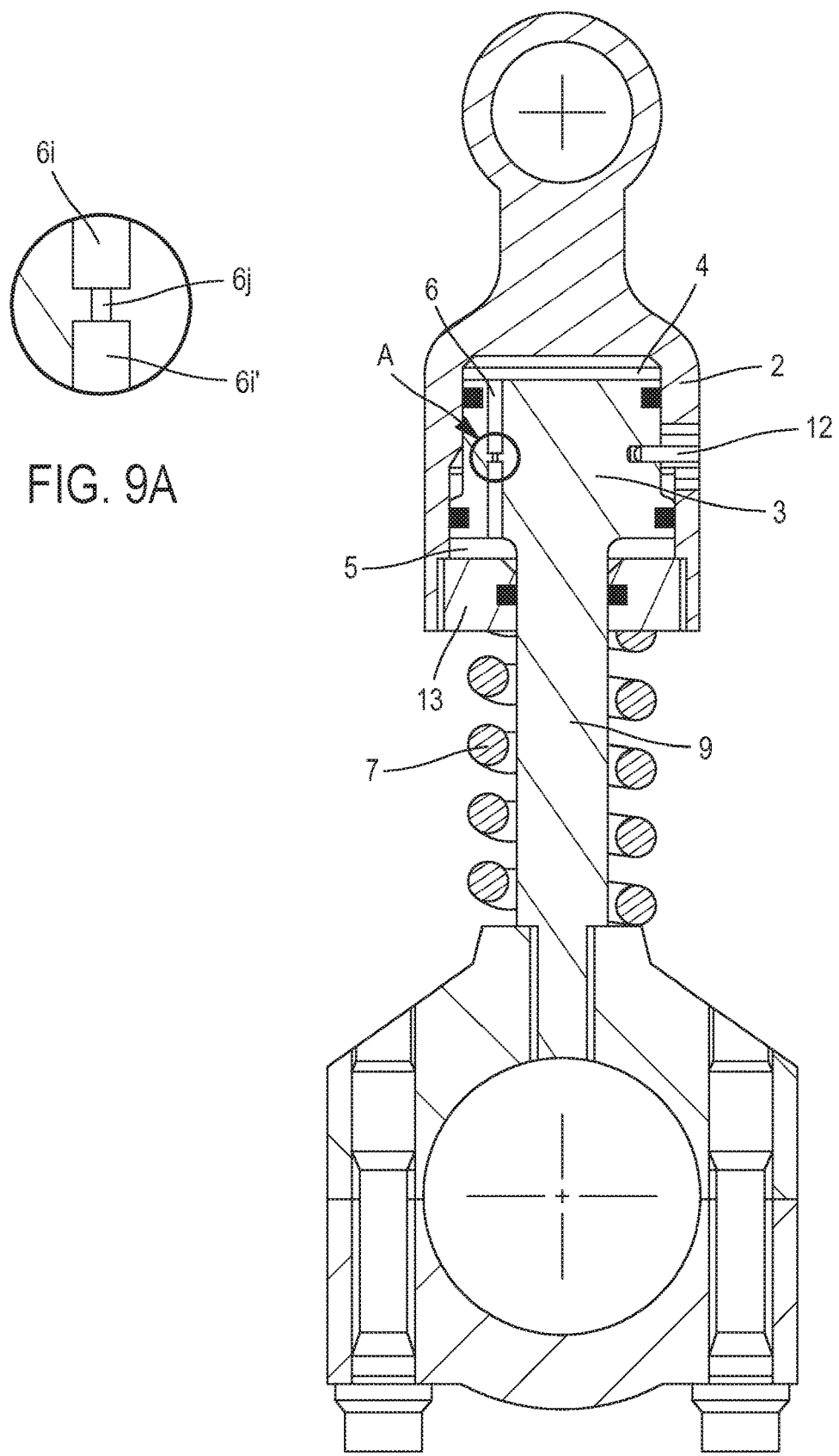
FIGS. 9 and 9A show a first embodiment of the disclosure.

According to the first embodiment, the self-contained device is built into the rod of a conventional engine as shown in FIGS. 1A and 1B, with the following characteristics:
  Combustion piston diameter: 75 mm;
  Stroke: 84 mm;
  Three-cylinder forming 1113 cm^3 of capacity;
  Maximum load: 25 bars MEP (mean effective pressure) for a maximum combustion pressure of 130b;
  A rod corresponding to this first example is shown in FIG. 9.

In this example, the big end of the rod is shaped to form the cylinder 2 in which the piston 3, which is attached to the rod, through the stem 9, runs. The opening of the cylinder 2 is closed by the cover 13, which can be screwed to the cylinder 2. The piston 3 thus defines in the cylinder 2 the high-pressure chamber 4 and the low-pressure chamber 5. The center-to-center spacing of the rod is 150 mm, when it is in its nominal position, and 146 mm when compressed and stopped.

Similarly to what was described in FIG. 7A, the rod has a double stage piston, formed by a shoulder 3c. The high-pressure chamber 4 has a diameter of 26.5 mm, thus representing a "useful" surface (that is the surface projected on the perpendicular plane to the piston axis of movement) of 552 mm² for the piston 3 fluid. The low-pressure chamber 5 has an internal diameter of 30 mm, and the stem 9 has a circular section with a diameter of 14 mm. Consequently, the useful surface for the fluid in this chamber for the piston 3 is 553 mm², therefore, almost identical to that of the high-pressure hydraulic chamber 4. The condition of equivalent sections is well respected.

In the piston 3, indexation means in the form of a pull pin 12 is placed across an oblong cylinder 2 opening (extending lengthwise in a longitudinal direction relative to the rod) to prevent the rotation of the piston 3 while enabling it to run.

A spring 7 is placed between the big and small ends of the rod, such as to apply a return force on the rod. In this particular example, the spring has a stiffness of 454 N/mm; and applies a pre-load force of 1266 N.

The rod shown in FIG. 9 is particularly simple, and has a single calibrated conduit 6 with an internal diameter of 0.44 mm to ensure the transfer of hydraulic fluid from one chamber to another under the traction and compression effect exerted on the rod. In the example shown in this figure, and as shown in greater detail in FIG. 9A, the conduit 6 comprises two end segments 6i and 6i' with a sectional diameter of 4 mm and a central segment 6j of 1 mm in length and 0.54 mm across. This configuration forms a conduit with precise calibration, whose flow function, under engine operating conditions, can be determined to be of the "turbulent" type.

When the engine is running, the combustion force exerted on the combustion piston and forces of inertia transmitted by the crankshaft are directly transmitted to the edges of the rod and relayed by the high- and low-pressure chambers 4, 5. Under the effect of these forces, and as explained previously, the piston 3 moves autonomously in the cylinder 2, thus leading to an adjustment of the length of the center-to-center spacing of the rod. The respective dimensions of the cylinder 2 and piston 3, enable a 4 mm play of the rod between its mechanical stops made up of the bottom of the cylinder 2 and the cover 13. This configuration of the constant stroke connecting rod, which helps adjust the top dead center of the combustion piston in the combustion cylinder, helps attain a respective compression ratio minimum of 10.3 and maximum of 17.6 when it is placed in the engine as previously described.

By "constant stroke," we mean that the distance separating the top dead center of the combustion piston remains constant to within 1% no matter the operating conditions of the engine (speed, load, etc.) when the engine is at any given operating point.

Figure 10:
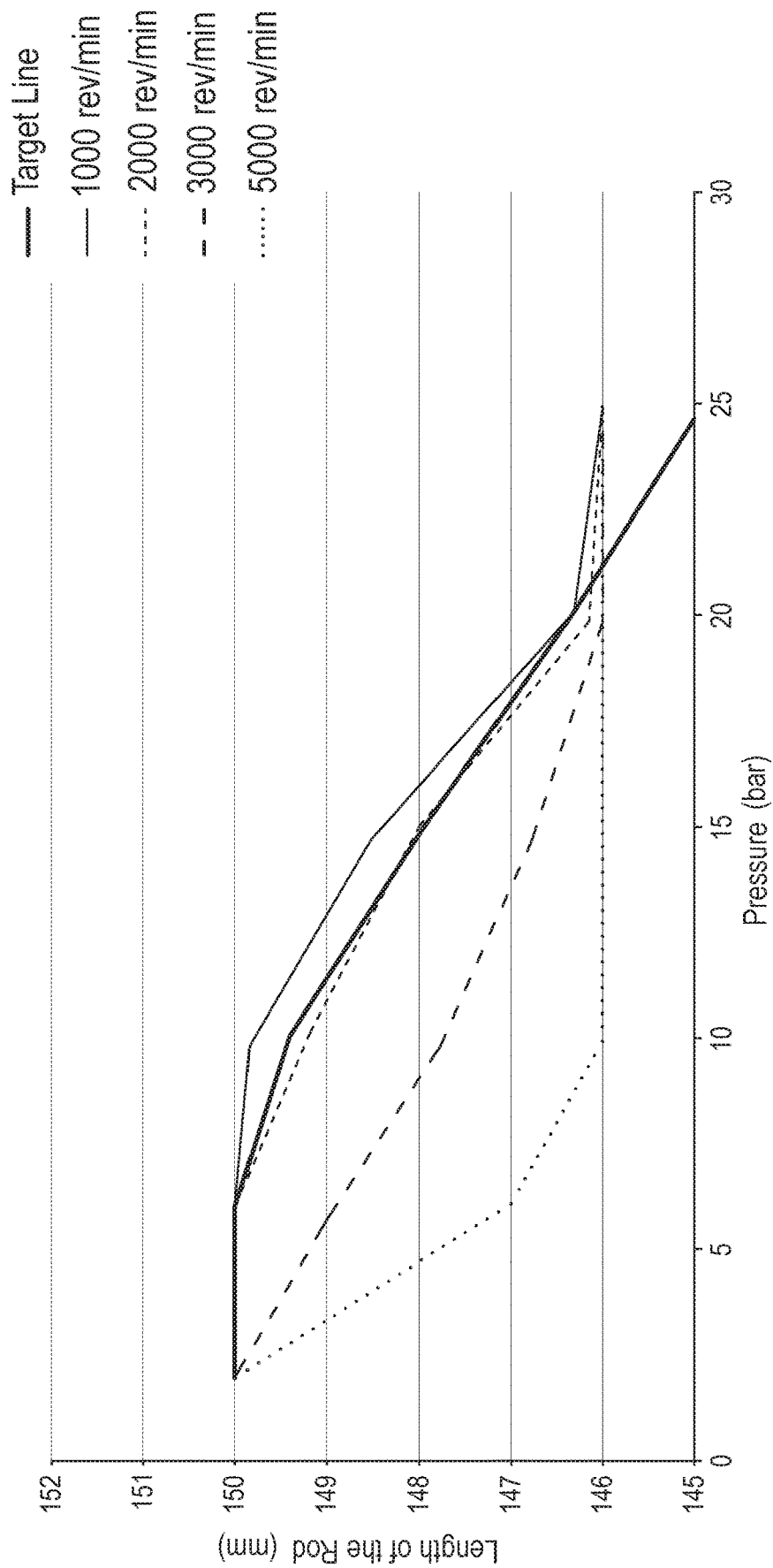
FIG. 10 shows the behavior of the first embodiment of the disclosure.

FIG. 10 shows the behavior of the connecting rod when it is operated in the engine with the previously stated characteristics. It can be observed that at low engine speed, it is possible to monitor the expected behavior function. At higher engine speed, and notwithstanding that the general behavior is totally acceptable and functional, the function deviates from the targeted behavior, however. The formation of a second calibrated conduit 6 helps adjust the behavior of the rod to the expected behavior for all ranges of engine speed. Whatever the case, it can be deduced from the curve in FIG. 10 that the length of the rod, and therefore its top dead center, is well adjusted, has a constant stroke, in line with the average forces exerted. Moreover, the hydraulic chambers 4, 5 and the piston 3 in this example are configured to have equivalent sections, and the configuration of conduit 6 enables "turbulent" flow under the engine's operating conditions, and thus the behavior is essentially independent from the temperature of the fluid.

Figure 11:
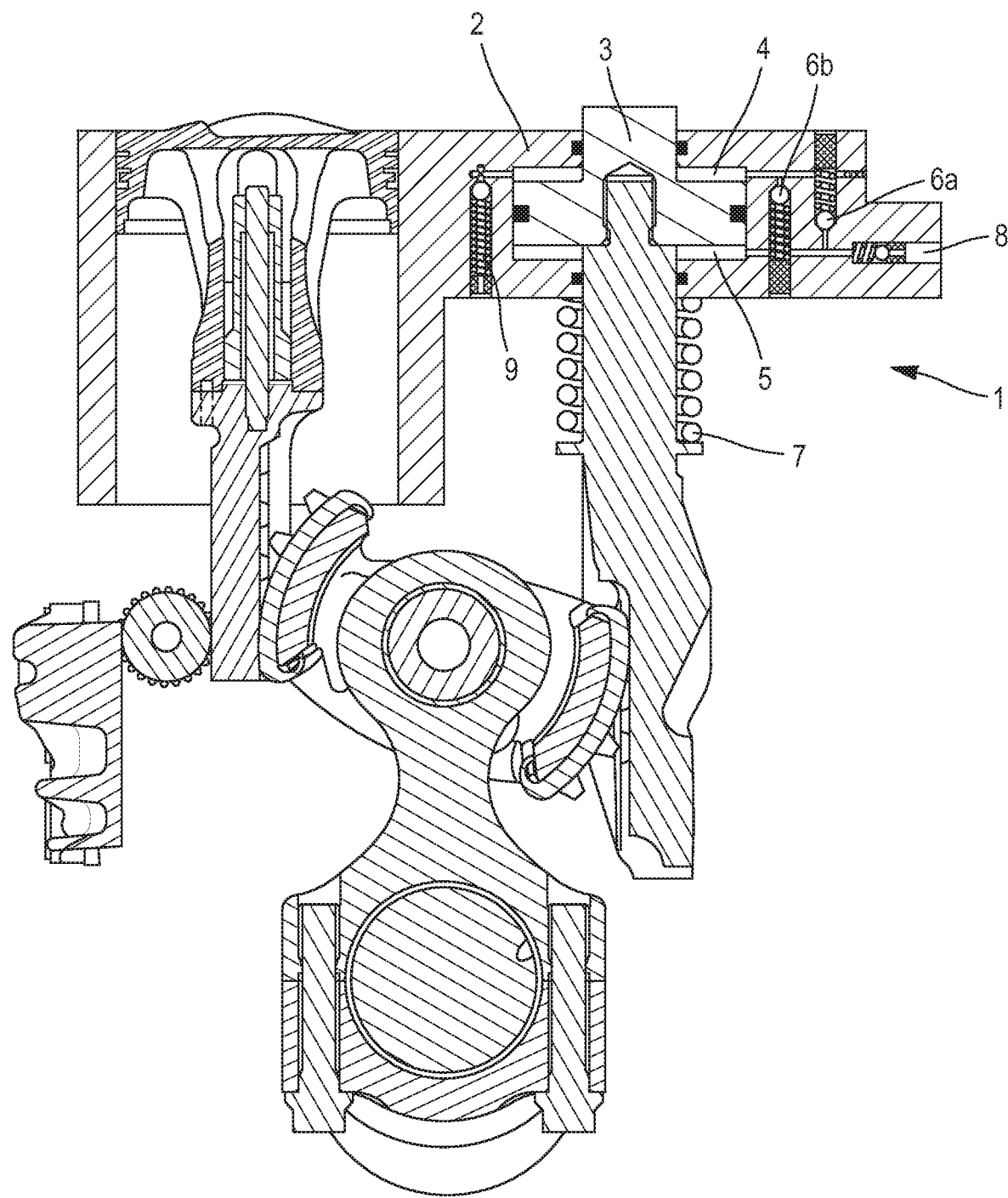
FIG. 11 shows the behavior of the second embodiment of the disclosure.

Example 2a: Self-Contained Device Built into a Control Member of the Variable Compression Ratio Engine FIG. 11 shows an overall diagrammatic section of a variable compression ratio engine. From EP1407125 certain mobile members that constitute such an engine are known:
  a combustion engine, able to play in a cylinder of the engine and attached to a transmission member;
  a roller that moves along the engine crankcase, which guides the translation movement of the transmission member.
  a sprocket wheel that interacts with the first rack and pinion of the transmission member and ensures transmission of movement between the combustion piston and the engine crankshaft; and
  a connecting rod interacting, at the first end, with the sprocket wheel and in the second end with the crankshaft.

A control element, that equally cooperates with the wheel, enables change of the vertical position of the wheel in the engine, and adjustment of the top dead center of the piston stroke in the cylinder, at constant stroke. Thus is an engine created with the possibility of varying its compression ratio.

The engine in FIG. 11 is distinct from the prior art in that the command member is not controlled through a control unit that activates its movement to adjust the top dead center position of the combustion piston, but is joined to the self-contained device of the disclosure, ensuring by itself the adjustment of the top dead center, at constant stroke, of the combustion piston, depending on the average combustion forces exerted.

Therefore, in the example in FIG. 11, the command member is joined to the piston 3, running in the cylinder formed inside the engine crankcase. In this example, the high-pressure chamber 4 and the low-pressure chamber 5 do relay traction and compression exerted on the command member. The return spring 7 is supported, on the one hand, by the collar formed by the command member and, on the other, by the opposite surface of the engine crankcase.

Similarly to what was described in FIG. 7B, the connecting rod has a piston with a salient external rod. This ensures the condition of equivalent section is met, and independence of functioning of the engine from any fluid temperature constraints.

The engine crankcase is provided with means 8 to fill the low-pressure hydraulic chamber 5 with hydraulic fluid, and means 9 to discharge excessive pressure that can build up in the high-pressure chamber 4.

The engine crankcase is also provided with a first compression conduit 6b with a differential valve set to a given opening pressure threshold. As has previously been presented, the presence of this differential valve helps limit the size and stiffness of the spring 7.

The engine crankcase also has a second traction conduit 6a with another differential valve with an equally determined pressure threshold.

When the engine is running, the combustion forces on the combustion piston and traction forces transmitted by the crankshaft are both transmitted through the command member wheel and relayed by the low- and high-pressure chambers 4, 5. Under the influence of these forces, and as has previously been explained, piston 3 moves autonomously in the cylinder 2, which helps to adjust the position of the command structure in translation, and as a consequence, the top dead center position of the combustion piston. The autonomous movement of the command structure, and the top dead center of the combustion piston, is adjusted depending on the average combustion forces exerted.

Information on the effective variation in compression ratio can be obtained (for example, to help in commanding engine members) from information on the position of the command member. To this effect, the engine in FIG. 11 can be provided with means to determine the position of the command structure.

Figure 12:
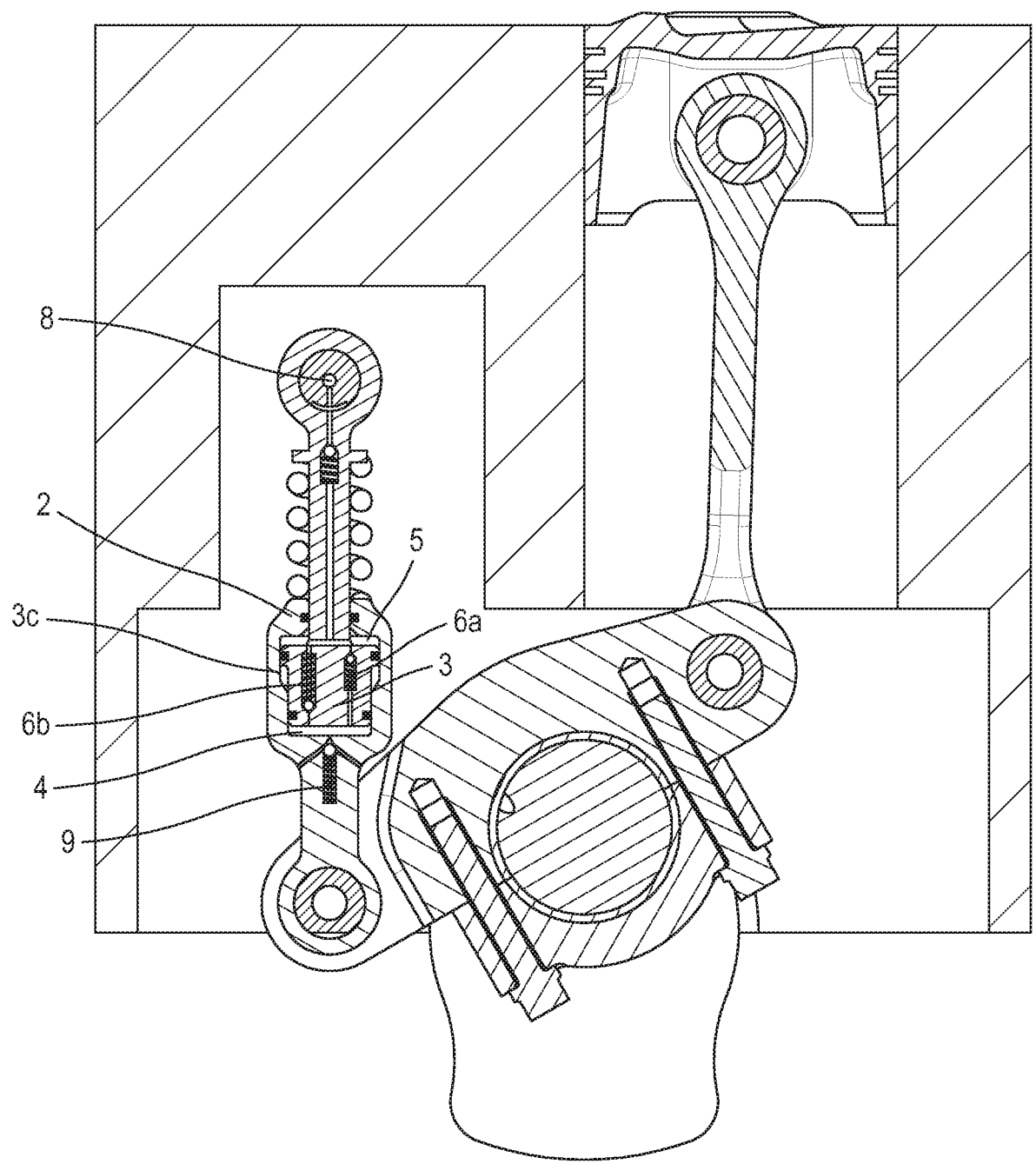
FIG. 12 shows the behavior of the third embodiment of the disclosure.

Example 2b: Self-Contained Device Built into a Command Member of the Variable Compression Ratio Engine FIG. 12 shows a diagram of an overall section of a variable compression ratio engine. Components of such an engine are known from Document DE102010019756. They include the following in the crankcase:
- a combustion piston, capable of sliding in the cylinder and attached to the connecting rod;
- a transmission structure attached to the rod and ensuring transmission of movement between the combustion piston and one crankshaft of the engine; and
- a command structure interacting with the transmission member as well as enabling adjustment of the top dead center of the piston stroke in the cylinder. Thus is an engine created with the possibility of varying its compression ratio.

In this type of engine, combustion efforts apply to the combustion piston and traction forces transmitted by the crankshaft are both transmitted through the transmission member to the command member.

The engine in FIG. 12 is distinct from the prior art in that the command member is not controlled through a command center that activates its movement to adjust the top dead center position of the combustion piston, but comprises the self-contained device 1 of the disclosure, ensuring by itself the adjustment of the top dead center of the combustion piston, depending on the average combustion forces exerted.

Therefore, in the example in FIG. 12, a stationary end of the command member is attached to the piston 3 running in the cylinder 2 and linked to a second end of this structure, which cooperates with the transmission structure. In this example, the high-pressure chamber 4 and the low-pressure chamber 5 do relay traction and compression exerted on the command member. The return spring 7 is partially supported by a collar formed on the part of the command structure attached to the piston 3 and partially on the other part of the command structure attached to the cylinder.

Similarly to what was described in FIG. 7A, the connecting rod has a piston rod that is double-staged, formed by the shoulder that ensures the condition of equivalent section is met, and the independence of functioning of the engine from any fluid temperature constraints.

The command structure is provided with means 8 to fill the low-pressure hydraulic chamber 5 with hydraulic fluid, and means 9 to discharge excessive pressure that can build up in the high-pressure chamber 4.

The cylinder 3 is also provided with a first compression conduit 6b with a differential valve set to a given opening pressure threshold. As has previously been presented, the presence of this differential valve helps limit the size and stiffness of the spring 7.

The piston 3 also has a second traction conduit 6a with another differential valve with an equally determined pressure threshold.

When the engine is running, the combustion forces on the combustion piston and traction forces transmitted by the crankshaft are both transmitted by the transmission member through the command member and relayed by the low- and high-pressure chambers 4, 5. Under the influence of these forces, and as has previously been explained, piston 3 moves autonomously in the cylinder 2, which helps to adjust the position of the command structure in translation, and as a consequence, the top dead center position of the combustion piston. The center-to-center distance of the command structure, and the top dead center of the combustion piston, are adjusted according to the average combustion forces.

Information on the effective compression ratio can be obtained (for example, to help in commanding engine members) from information on the position of the command member. To this effect, the engine in FIG. 12 can be provided with means to determine the position of the command structure.

Example 3: Self-Contained Device Built into a Variable Compression Ratio Engine with an "Eccentric" Rod According to this embodiment, the self-contained device 1 is built into the eccentric rod of a variable compression ratio engine.

The functioning of engines with an eccentric rod is known from Document DE102011056298. A means for the eccentric coupling of the rod to the piston can be made to rotate through the use of two pistons, thus enabling adjustment of the center-to-center distance of the rod and the top dead center of the combustion piston, at constant stroke, to form a variable compression ratio engine. In the solution in the cited document, piston movement is controlled through a hydraulic command center.

Figure 13:
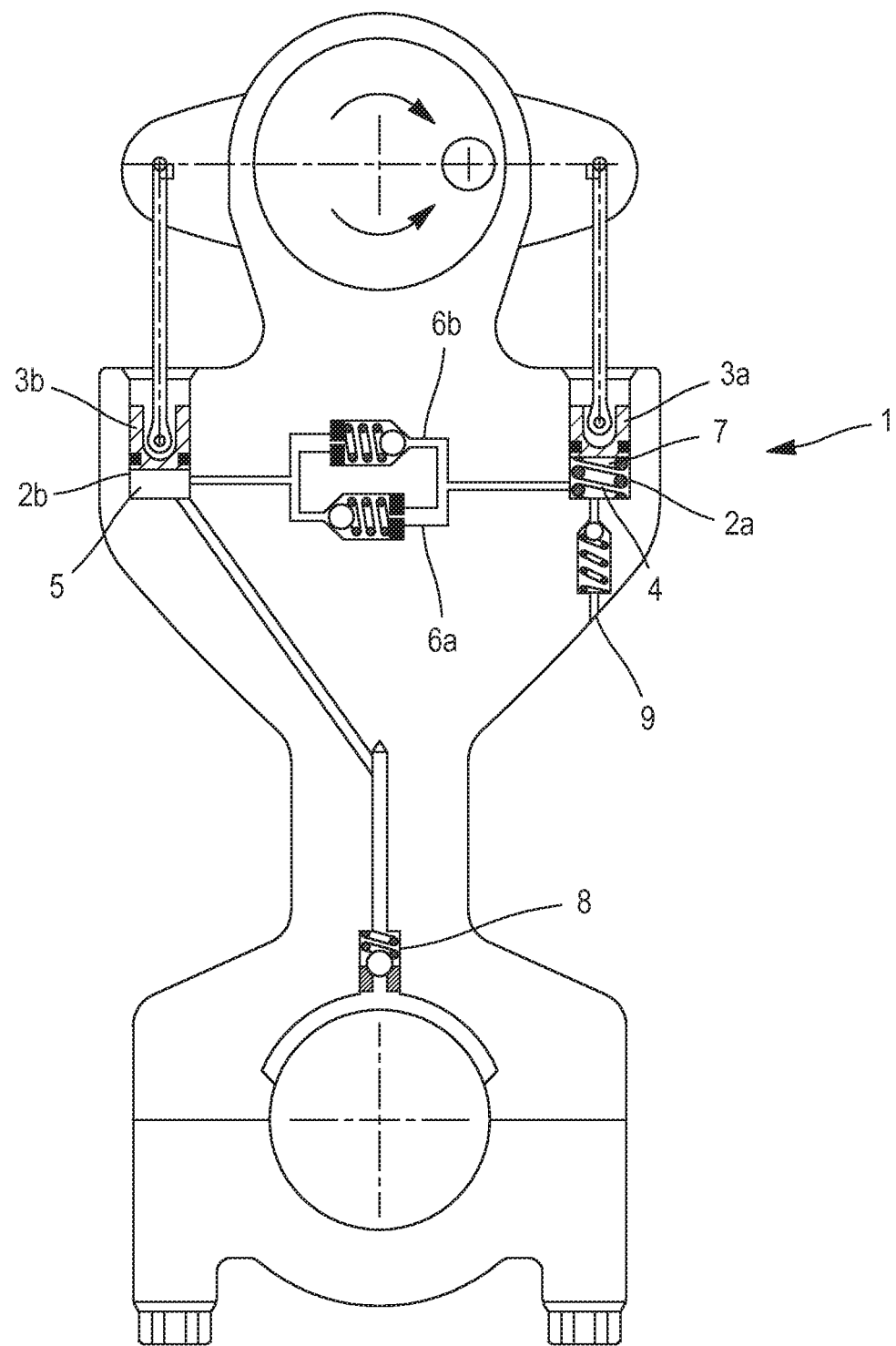
FIG. 13 shows the behavior of the fourth embodiment of the disclosure.

The engine in FIG. 13 is distinct from the prior art in that the eccentric part of the rod is not controlled through a command center, nor by any external mechanical component, that activates its movement to adjust the top dead center position of the combustion piston, but is joined to the self-contained device of the disclosure, ensuring by itself the adjustment of the top dead center, at constant stroke, of the combustion piston, depending on the average combustion forces exerted.

FIG. 13 shows an overall diagrammatic section of a variable compression ratio engine. Two pistons 3b, 3a slide respectively in two cylinders 2a, 2b to define the low- and high-pressure hydraulic chambers 5, 4. The high-pressure chamber 4 also comprises a return spring 7, bearing on the one hand on the main surface of the piston and on the other hand on the bottom of the chamber, in order to apply a return force.

The sections of the high- and low-pressure chambers 4, 5 are chosen such that the volume created by the play of pistons 3a, 3b in the corresponding cylinder 2a, 2b is identical to the volume created by the play of the other pistons 3a, 3b in their cylinder thanks to the mechanical and kinematics link created by the eccentric part. The condition of equivalent section and the independence of the operation of the engine from fluid temperature constraints is assured.

The connecting rod is provided with means 8 to fill the low-pressure hydraulic chamber 5 with hydraulic fluid, and means 9 to discharge excessive pressure that can build up in the high-pressure chamber 4.

The rod is also provided with a compression conduit 6b enabling fluid to flow from the high-pressure chamber 4 to the low-pressure chamber 5, the conduit 6b having a differential valve with a rated opening pressure threshold. As has previously been presented, the presence of this differential valve helps limit the size and stiffness of the spring 7.

The rod also has a second traction conduit 6a enabling the flow of fluid from the low-pressure chamber 5 to the high-pressure chamber 4 with a differential valve and an opening pressure threshold as well.

Similarly to the preceding examples, the combustion pressures exerted on the combustion piston and the traction forces transmitted by the crankshaft are both applied on the eccentric rod and relayed by the low- and high-pressure chambers 5, 4. Under the effect of these forces, and as explained previously, the pistons 3a, 3b move autonomously in the cylinders 2a, 2b, thus leading to a rotative adjustment of the angular position of the eccentric link and by so doing, the center-to-center distance of the rod. In this example as well, the center-to-center distance of the rod, and the top dead center of the combustion piston, are adjusted according to the average combustion forces.

Example 4: Self-Contained Device Built into a Variable Compression Ratio Engine with a Dephased Rod The functioning of engines with an eccentric rod is known from Document EP2620614. In this type of engine, the small end of the rod is joined to the crankshaft wall through an eccentric link. A gear system helps move the rod by rotation through the eccentric axis, and therefore to shift the top (and bottom) dead center of the combustion piston. In the solution shown in the above-cited document, this movement is controlled by a piloted electric activator, which rotates an axis running parallel to the axis of the crankshaft and is able to activate the gear system. This functioning is particularly well visible in FIG. 14 of the above-mentioned document.

Figure 14:
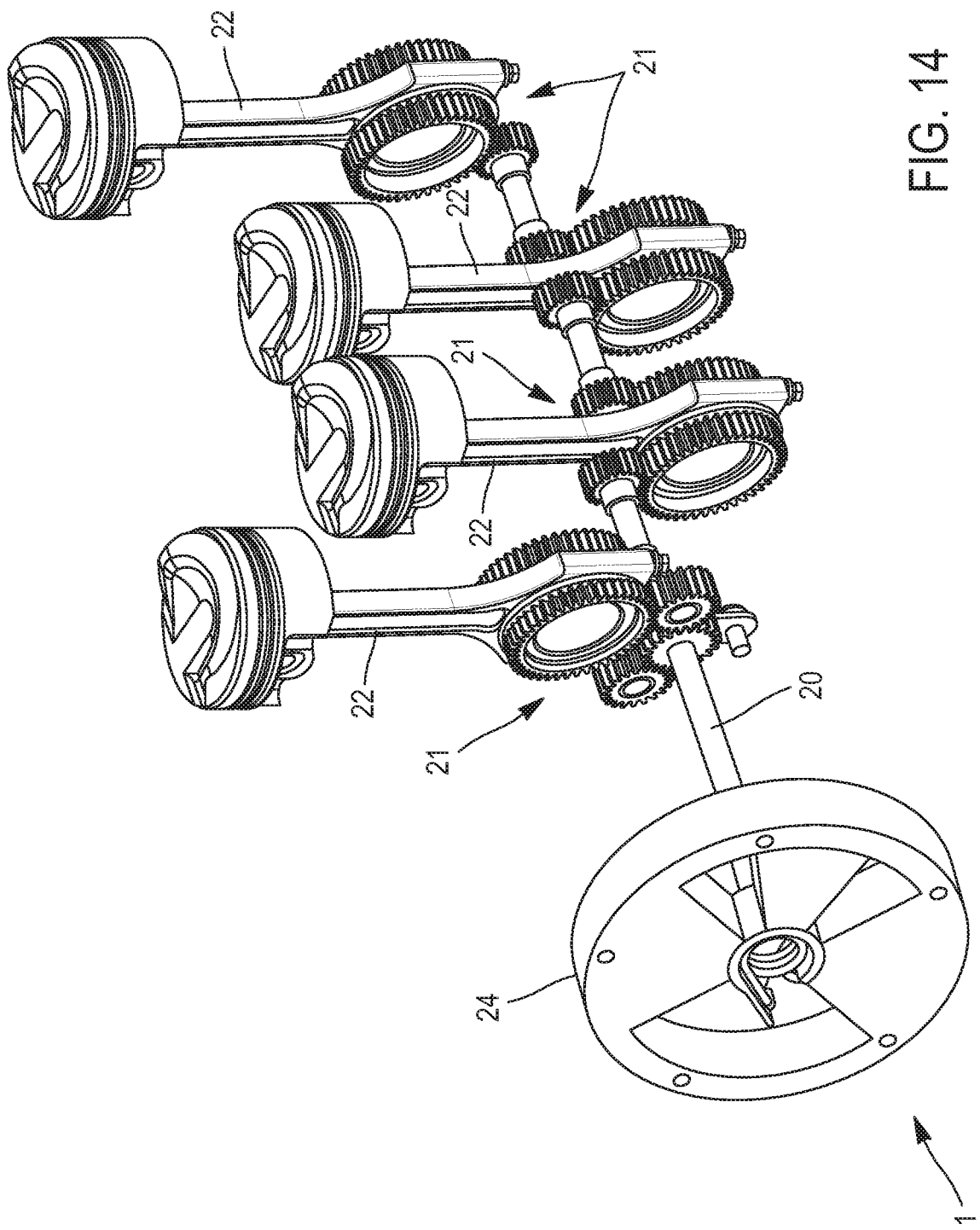
FIGS. 14 and 15 show a fifth embodiment of the disclosure.

The engine of FIG. 14 shows an example of implementation distinct from the state of technology in that the eccentric part of the rods are not controlled through the piloted electric activator, but through the self-contained device 1 of the disclosure, which alone ensures the adjustment of the top dead center positions, at constant stroke, of the combustion pistons, in accordance with the average combustion forces exerted.

As such, the self-contained device 1 is attached to the engine block. The piston 3 is joined to an axle 20 rotating the gear systems 21 that drive the rods 22 through rotation round their eccentric axes, thus enabling displacement of the top (and bottom) dead centers of the combustion piston. Forces exerted on the combustion pistons are transmitted by this mechanism and relayed by the self-contained device 1.

Figure 15:
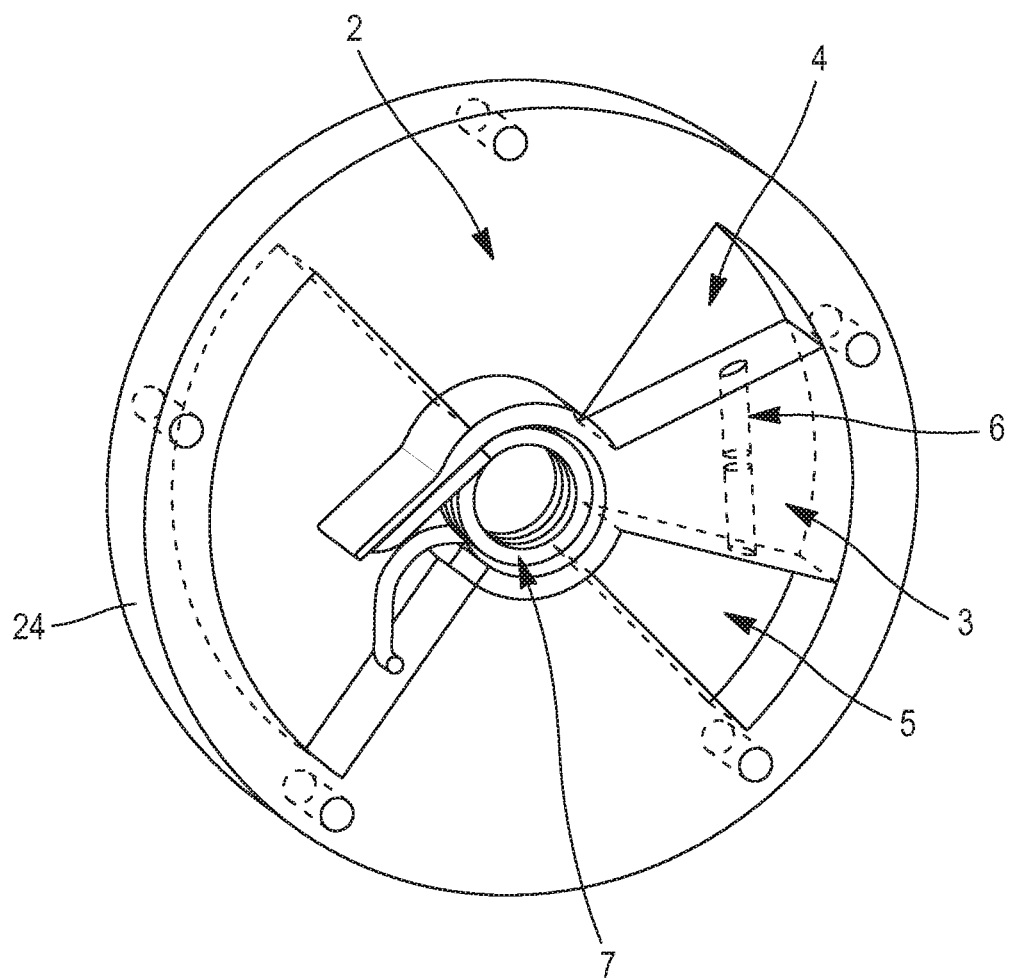

As shown in greater detail in FIG. 15, the self-contained device 1 comprises a cylinder 2 with a bore in disc portion within a low-height cylindrical body 24 (see also FIG. 14) and attached to the engine block. The piston 3 is made up of a radial part that can rotate within the bore in disc portion made following the main axis of the cylindrical body 24, and joined to command shaft of the ratio variation mechanism. This piston 3 thus clearly, within the bore in disc portion forming the cylinder 2, defines a high-pressure hydraulic chamber 4 and a low-pressure hydraulic chamber 5, on either side of the piston 3. In other words, the high- and low-pressure hydraulic chambers 4, 5 are defined by the spaces created on either part of a piston 3 rotating in the portion of the cylinder.

A second bore with a small height is formed in the cylindrical body 24, opposite the cylinder 2. As shown in FIG. 15, the return means, in the form of a spring 7, is arranged in the bore formed in the axial part of the piston 3. In the example in FIG. 15, a calibrated conduit 6, formed in the piston 3, enables flow of hydraulic fluid from one chamber to another.

Similarly to the preceding examples, the combustion pressures exerted on the combustion piston and the traction forces are both exerted on the piston 3 through the axle 20 (FIG. 14), among others, and relayed by the low- and high-pressure chambers 5, 4. Under the effect of these forces, and as explained previously, the piston 3 moves autonomously in the cylinder 2, thus leading to a rotative adjustment of the angular position of the eccentric link at the level of each rod and by so doing, the height of the top dead center of the combustion engine is modified. In this example as well, the top dead center of 5 the combustion piston, is adjusted according to the average combustion forces.

The invention claimed is:

1. A variable compression ratio engine, comprising:
   a stationary engine block in which movable members including a combustion piston, a rod, and a crankshaft, interact to enable the piston to translate in a combustion cylinder of the engine block, defining a stroke of the combustion piston ranging from top dead center to bottom dead center, wherein the translation is caused by forces resulting from combustion of a mixture in the cylinder and inertial forces of the crankshaft; and a self-contained adjustment device to adjust the top dead center of the combustion piston, the adjustment device being linked to or built into at least one of the movable members and including:
- a high-pressure hydraulic chamber to counteract the combustion and inertial forces at the bottom dead center;
- a low-pressure hydraulic chamber to counteract the inertial forces at the top dead center;
- at least one calibrated conduit to enable hydraulic fluid to flow between the high- and low-pressure hydraulic chambers; and
- a mechanical return device to bring the adjustment device back to a nominal position;
- wherein the mechanical return device and the at least one calibrated conduit are configured so as to enable the self-contained device to operate as a damped oscillating system during operation of the engine.

2. The variable compression ratio engine according to claim 1, wherein the average characteristics of the mechanical return device and the at least one calibrated conduit enable adjustment of the top dead center of the combustion piston to average tension and compression forces in compliance with a predetermined equation.

3. The variable compression ratio engine according to claim 1, wherein the high- and low-pressure hydraulic chambers are defined by the spaces on either side of an adjustment device piston as it moves in an adjustment device cylinder.

4. The variable compression ratio engine according to claim 1, wherein the high-pressure hydraulic chamber is defined by a first cylinder and a first piston and the low-pressure hydraulic chamber is defined by a second cylinder and a second piston.

5. The variable compression ratio engine according to claim 1, wherein the low-pressure hydraulic chamber and/or the high-pressure hydraulic chamber is equipped with a hydraulic fluid filling means.

6. The variable compression ratio engine according to claim 1, wherein the high-pressure hydraulic chamber and/ or the low-pressure hydraulic chamber are provided with discharge means for discharging excess hydraulic fluid accumulating in the chambers.

7. The variable compression ratio engine according to claim 1, wherein the high-pressure hydraulic chamber and the low-pressure hydraulic chamber have equivalent cross sections.

8. The variable compression ratio engine according to claim 1, wherein the self-contained adjustment device is configured to adjust the length of the rod.

9. The variable compression ratio engine according to claim 1, wherein the self-contained adjustment device is configured to adjust the length of a command structure controlling the compression rate of the engine.

10. The variable compression ratio engine according to claim 1, wherein the self-contained adjustment device is configured to adjust the position of a command structure controlling the compression rate of the engine.

11. The variable compression ratio engine according to claim 1, wherein the self-contained adjustment device is set in at least one of the movable members.

12. The variable compression ratio engine according to claim 1, further comprising a mechanism for determining the compression ratio.

13. The variable compression ratio engine according to claim 1, wherein the self-contained adjustment device comprises:
- at least one calibrated tension conduit only allowing fluid flow from the low-pressure hydraulic chamber to the high-pressure hydraulic chamber; and
- at least one calibrated compression conduit only allowing fluid flow from the high-pressure hydraulic chamber to the low-pressure hydraulic chamber.

14. The variable compression ratio engine according to claim 13, wherein at least one calibrated compression conduit only allows fluid flow when a pressure in the high-pressure hydraulic chamber exceeds a pressure in the low-pressure hydraulic chamber by a determined amount.

15. The variable compression ratio engine according to claim 13, wherein the at least one calibrated compression conduit comprises two or more calibrated compression conduits.

16. The variable compression ratio engine according to claim 1, wherein the at least one calibrated conduit is configured to promote turbulent fluid flow.

17. The variable compression ratio engine according to claim 1, wherein the mechanical return device comprises a spring.

* * * * *